United States Patent
Miyake et al.

(10) Patent No.: US 12,090,399 B2
(45) Date of Patent: Sep. 17, 2024

(54) NON-TRANSITORY COMPUTER READABLE MEDIUM STORING PLAN PROCESSING PROGRAM AND TASK PROCESSING SYSTEM

(71) Applicant: SQUARE ENIX CO., LTD., Tokyo (JP)

(72) Inventors: Youichiro Miyake, Tokyo (JP); Kousuke Namiki, Tokyo (JP); Tomohiro Mori, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 17/807,225

(22) Filed: Jun. 16, 2022

(65) Prior Publication Data
US 2023/0010100 A1 Jan. 12, 2023

(30) Foreign Application Priority Data
Jul. 11, 2021 (JP) .................... 2021-114675

(51) Int. Cl.
*A63F 13/57* (2014.01)
*A63F 13/47* (2014.01)
*A63F 13/55* (2014.01)

(52) U.S. Cl.
CPC .............. *A63F 13/47* (2014.09); *A63F 13/55* (2014.09); *A63F 13/57* (2014.09)

(58) Field of Classification Search
CPC .......... A63F 13/45; A63F 13/47; A63F 13/48; A63F 13/55; A63F 13/56; A63F 13/57; A63F 13/573; A63F 13/577; A63F 13/58; A63F 13/49; A63F 13/493; A63F 13/497; A63F 13/50
See application file for complete search history.

(56) References Cited

U.S. PATENT DOCUMENTS

| | | | | |
|---|---|---|---|---|
| 6,052,667 A * | 4/2000 | Walker | ................. | G06Q 10/087 705/15 |
| 6,064,987 A * | 5/2000 | Walker | .................. | G06Q 40/02 705/40 |
| 6,119,099 A * | 9/2000 | Walker | ............... | G06Q 30/0212 705/16 |
| 6,138,105 A * | 10/2000 | Walker | ............... | G06Q 30/0237 235/385 |
| 6,203,427 B1 * | 3/2001 | Walker | ................ | G07F 17/3288 463/16 |

(Continued)

FOREIGN PATENT DOCUMENTS

JP        2012213485 A    11/2012

OTHER PUBLICATIONS

JP 2012-213485 A, machine translation, downloaded from https://www.j-platpat.inpit.go.jp/p0200, Feb. 10, 2024.*

*Primary Examiner* — David L Lewis
*Assistant Examiner* — Matthew D Hoel
(74) *Attorney, Agent, or Firm* — Dorsey & Whitney LLP

(57) ABSTRACT

A plan processing program for planning a task executed by a character based on a hierarchical task network causes a server to implement a plan generation function of generating a plan configured with a plurality of tasks from a domain based on goal information, in which in the plan generation function, a function of generating the plan in which a subsequent task to be employed is configured to change in accordance with a state or a condition is implemented.

12 Claims, 36 Drawing Sheets

(56) References Cited

U.S. PATENT DOCUMENTS

| | | | | |
|---|---|---|---|---|
| 6,223,163 B1* | 4/2001 | Van Luchene | G07G 1/12 | 705/16 |
| 6,227,972 B1* | 5/2001 | Walker | G06Q 20/204 | 463/20 |
| 6,292,198 B1* | 9/2001 | Matsuda | G06N 3/006 | 345/473 |
| 6,298,329 B1* | 10/2001 | Walker | G06Q 30/0226 | 705/14.27 |
| 6,298,331 B1* | 10/2001 | Walker | G06Q 20/12 | 705/16 |
| 6,341,268 B2* | 1/2002 | Walker | G07G 1/12 | 705/400 |
| 6,876,978 B1* | 4/2005 | Walker | G07G 1/0036 | 705/14.1 |
| 7,086,947 B2* | 8/2006 | Walker | G07F 17/3251 | 463/16 |
| 7,184,990 B2* | 2/2007 | Walker | G06Q 20/201 | 705/16 |
| 7,351,142 B2* | 4/2008 | Walker | G06Q 30/06 | 273/269 |
| 7,440,447 B2* | 10/2008 | Kareev | H04L 67/131 | 370/359 |
| 7,542,919 B1* | 6/2009 | Mueller | G07F 17/3248 | 705/16 |
| 7,572,187 B2* | 8/2009 | Van Luchene | A63F 13/12 | 463/42 |
| 7,587,333 B1* | 9/2009 | Walker | G06Q 10/087 | 705/16 |
| 7,606,729 B1* | 10/2009 | Walker | G07F 17/3255 | 705/14.1 |
| 7,637,813 B2* | 12/2009 | Katayama | A63F 13/573 | 463/31 |
| 7,645,194 B2* | 1/2010 | Van Luchene | G07F 17/32 | 463/25 |
| 7,651,395 B2* | 1/2010 | Van Luchene | G07F 17/32 | 463/29 |
| 7,666,095 B2* | 2/2010 | Van Luchene | A63F 13/35 | 463/29 |
| 7,677,973 B2* | 3/2010 | Van Luchene | A63F 13/792 | 463/29 |
| 7,677,974 B2* | 3/2010 | Van Luchene | A63F 13/822 | 463/29 |
| 7,677,975 B2* | 3/2010 | Van Luchene | G07F 17/3255 | 463/29 |
| 7,677,979 B2* | 3/2010 | Van Luchene | G07F 17/32 | 463/42 |
| 7,686,691 B2* | 3/2010 | Van Luchene | G06Q 30/04 | 463/29 |
| 7,688,834 B2* | 3/2010 | Bardalai | H04Q 11/0062 | 370/438 |
| 7,690,990 B2* | 4/2010 | Van Luchene | G07F 17/32 | 463/25 |
| 7,690,997 B2* | 4/2010 | Van Luchene | A63F 13/795 | 463/42 |
| 7,717,782 B2* | 5/2010 | Van Luchene | A63F 13/847 | 463/9 |
| 7,775,885 B2* | 8/2010 | Van Luchene | A63F 13/67 | 463/42 |
| 7,780,532 B2* | 8/2010 | Van Luchene | A63F 13/85 | 705/37 |
| 7,806,758 B2* | 10/2010 | Van Luchene | A63F 13/30 | 463/1 |
| 7,833,096 B2* | 11/2010 | Sakaguchi | A63F 13/5372 | 463/31 |
| 7,889,640 B2* | 2/2011 | Bardalai | H04J 14/0283 | 398/5 |
| 7,908,462 B2* | 3/2011 | Sung | G06N 3/006 | 463/2 |
| 7,966,239 B2* | 6/2011 | Van Luchene | G07F 17/32 | 463/25 |
| 7,974,901 B2* | 7/2011 | Van Luchene | A63F 13/75 | 463/43 |
| 7,974,902 B2* | 7/2011 | Van Luchene | G06Q 40/00 | 463/16 |
| 7,984,122 B2* | 7/2011 | Titus | G06F 9/5044 | 713/1 |
| 7,986,623 B2* | 7/2011 | Bardalai | H04L 47/762 | 370/235 |
| 8,070,596 B2* | 12/2011 | Van Luchene | G07F 17/3281 | 463/25 |
| 8,070,599 B2* | 12/2011 | Van Luchene | G06Q 30/06 | 463/29 |
| 8,202,147 B2* | 6/2012 | Yamada | A63F 13/56 | 463/31 |
| 8,218,968 B2* | 7/2012 | Bardalai | H04L 45/02 | 398/2 |
| 8,221,242 B2* | 7/2012 | Van Luchene | A63F 13/35 | 463/42 |
| 8,221,243 B2* | 7/2012 | Van Luchene | A63F 13/85 | 463/42 |
| 8,226,472 B2* | 7/2012 | Van Luchene | A63F 13/792 | 463/25 |
| 8,251,810 B2* | 8/2012 | Van Luchene | A63F 13/69 | 463/29 |
| 8,257,173 B2* | 9/2012 | Bergelt | A63F 13/10 | 463/31 |
| 8,262,471 B2* | 9/2012 | Van Luchene | G07F 17/3276 | 463/29 |
| 8,342,963 B2* | 1/2013 | Steiner | A63F 13/5258 | 463/36 |
| 8,376,851 B2* | 2/2013 | Yamada | A63F 13/57 | 463/31 |
| 8,393,963 B2* | 3/2013 | Okamura | A63F 13/211 | 463/36 |
| 8,454,431 B2* | 6/2013 | Van Luchene | A63F 13/35 | 463/25 |
| 8,454,442 B2* | 6/2013 | Van Luchene | G07F 17/323 | 463/42 |
| 8,469,821 B2* | 6/2013 | Van Luchene | G07F 17/323 | 463/42 |
| 8,554,526 B2* | 10/2013 | Andersen | A63F 13/577 | 463/43 |
| 8,565,248 B2* | 10/2013 | Le Faucheur | H04L 47/724 | 370/409 |
| 8,574,065 B2* | 11/2013 | Van Luchene | G07F 17/3244 | 463/40 |
| 8,608,536 B2* | 12/2013 | Van Luchene | G07F 17/3281 | 463/31 |
| 8,696,448 B2* | 4/2014 | Van Luchene | G07F 17/32 | 463/28 |
| 8,734,229 B2* | 5/2014 | Van Luchene | A63F 13/792 | 463/25 |
| 8,751,343 B2* | 6/2014 | Van Luchene | G06Q 30/0279 | 705/35 |
| 8,751,344 B2* | 6/2014 | Van Luchene | G06Q 30/0279 | 705/35 |
| 8,805,773 B2* | 8/2014 | Fiedler | A63F 13/358 | 706/62 |
| 8,821,234 B2* | 9/2014 | Johnston | A63F 13/63 | 715/272 |
| 8,832,568 B2* | 9/2014 | Baszucki | G06F 3/04815 | 715/757 |
| 8,913,064 B2* | 12/2014 | McNeely | G06T 13/20 | 345/473 |
| 9,037,977 B1* | 5/2015 | Tovino | H04M 3/5175 | 715/734 |
| 9,203,752 B2* | 12/2015 | Chen | H04L 45/30 | |
| 9,397,861 B1* | 7/2016 | Tovino | H04L 67/02 | |
| 9,440,151 B2* | 9/2016 | Van Luchene | A63F 13/792 | |
| 9,455,946 B1* | 9/2016 | Tovino | H04L 65/1069 | |
| 9,513,132 B2* | 12/2016 | Fowe | G01C 21/34 | |
| 9,600,306 B2* | 3/2017 | Hamilton | H04L 67/131 | |
| 9,674,267 B2* | 6/2017 | Fiedler | A63F 13/358 | |
| 9,767,498 B2* | 9/2017 | Greystoke | G06Q 30/0619 | |
| 10,038,572 B1* | 7/2018 | Seshadri | H04L 45/7452 | |
| 10,062,354 B2* | 8/2018 | Dutt | H04L 41/083 | |
| 10,163,420 B2* | 12/2018 | Dutt | G06N 3/047 | |
| 10,185,917 B2* | 1/2019 | Greystoke | G06Q 30/0619 | |

(56) References Cited

U.S. PATENT DOCUMENTS

| | | | | |
|---|---|---|---|---|
| 10,432,754 B2* | 10/2019 | Fisher | | H04L 69/03 |
| 10,437,889 B2* | 10/2019 | Greystoke | | G06F 16/951 |
| 10,514,683 B2* | 12/2019 | Fisher | | G05B 19/41855 |
| 10,576,380 B1* | 3/2020 | Beltran | | A63F 13/65 |
| 10,702,778 B2* | 7/2020 | Rowe | | A63F 13/577 |
| 10,792,568 B1* | 10/2020 | Merrill | | A63F 13/56 |
| 10,828,568 B2* | 11/2020 | Kurabayashi | | A63F 13/35 |
| 10,874,943 B2* | 12/2020 | Fajt | | A63F 13/57 |
| 10,970,291 B2* | 4/2021 | McNeela | | G06F 16/24578 |
| 11,033,815 B2* | 6/2021 | Youm | | A63F 13/355 |
| 11,115,319 B2* | 9/2021 | Lopez | | H04L 12/4633 |
| 11,192,027 B2* | 12/2021 | Kojima | | A63F 13/63 |
| 11,223,932 B2* | 1/2022 | Baghel | | H04W 4/38 |
| 11,241,621 B2* | 2/2022 | Miyake | | A63F 13/56 |
| 11,295,506 B2* | 4/2022 | Yerli | | H01L 25/0652 |
| 11,301,951 B2* | 4/2022 | Yerli | | A63F 13/52 |
| 11,406,898 B2* | 8/2022 | Miyake | | A63F 13/35 |
| 11,509,561 B2* | 11/2022 | Mirsky | | H04L 43/10 |
| 2002/0154174 A1* | 10/2002 | Redlich | | G06F 16/954 |
| | | | | 715/848 |
| 2002/0175918 A1* | 11/2002 | Barber | | G06T 19/003 |
| | | | | 345/474 |
| 2003/0058238 A1* | 3/2003 | Doak | | A63F 13/45 |
| | | | | 709/217 |
| 2006/0293839 A1* | 12/2006 | Stankieiwcz | | G01C 21/20 |
| | | | | 701/434 |
| 2007/0198178 A1* | 8/2007 | Trimby | | G06N 5/01 |
| | | | | 701/533 |
| 2007/0276709 A1* | 11/2007 | Trimby | | A63F 13/00 |
| | | | | 705/6 |
| 2008/0008168 A1* | 1/2008 | Nadeau | | H04L 69/22 |
| | | | | 370/389 |
| 2008/0133652 A1* | 6/2008 | Richards | | A63F 13/358 |
| | | | | 709/203 |
| 2008/0220862 A1* | 9/2008 | Axelrod | | G06T 19/003 |
| | | | | 463/31 |
| 2009/0150790 A1* | 6/2009 | Wilhelm | | A63F 13/10 |
| | | | | 715/737 |
| 2009/0197686 A1* | 8/2009 | Bergelt | | A63F 13/45 |
| | | | | 463/43 |
| 2010/0235608 A1* | 9/2010 | Armoni | | G06F 15/8023 |
| | | | | 712/16 |
| 2012/0129595 A1* | 5/2012 | Kim | | H04N 7/181 |
| | | | | 463/29 |
| 2014/0115533 A1* | 4/2014 | Suzuki | | G06F 3/0485 |
| | | | | 715/799 |
| 2018/0012403 A1* | 1/2018 | Luo | | A63F 13/358 |
| 2018/0250595 A1* | 9/2018 | Kurabayashi | | A63F 13/55 |
| 2019/0026956 A1* | 1/2019 | Gausebeck | | G06T 19/20 |
| 2021/0060432 A1* | 3/2021 | Miyake | | A63F 13/355 |
| 2023/0010100 A1* | 1/2023 | Miyake | | A63F 13/57 |

* cited by examiner

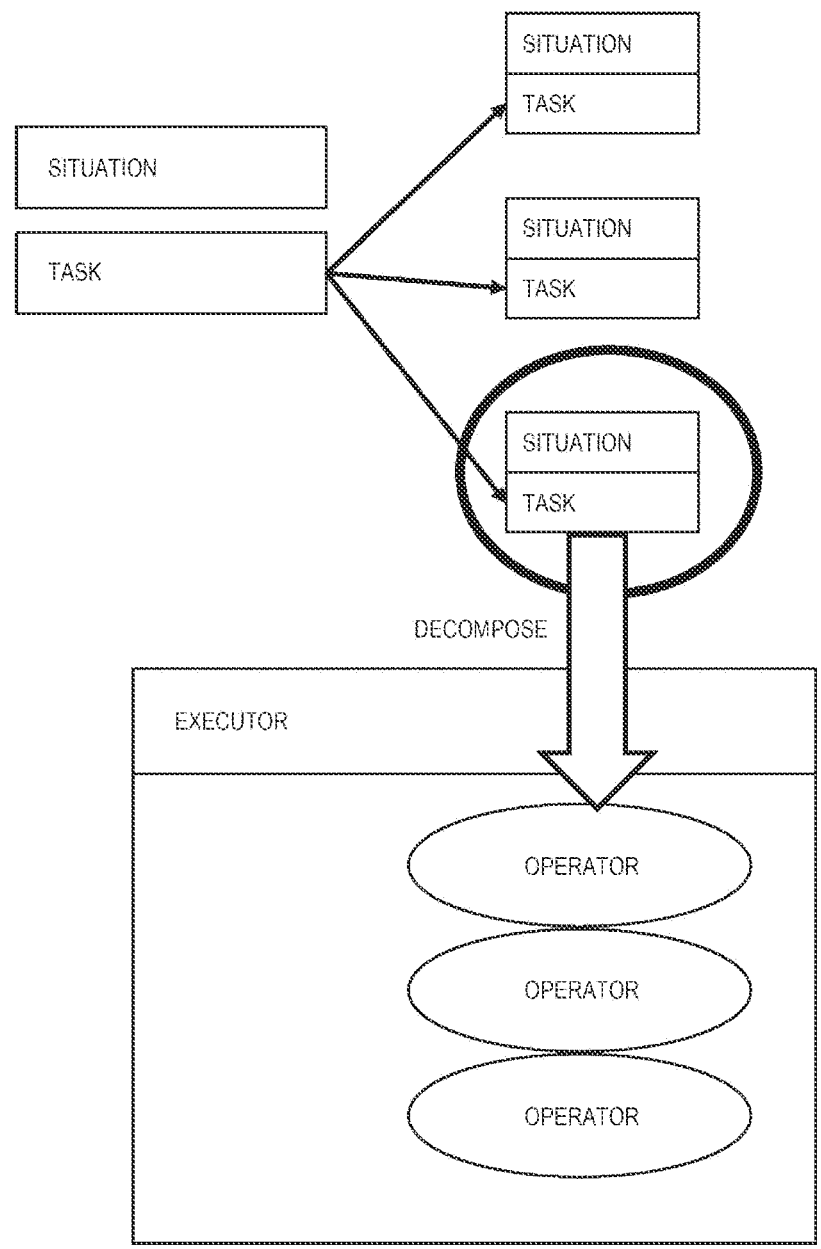

NON-TRANSITORY COMPUTER READABLE MEDIUM STORING PLAN PROCESSING PROGRAM AND TASK PROCESSING SYSTEM

CROSS REFERENCE TO RELATED APPLICATIONS

This application claims priority to and the benefit of Japanese Patent Application No. JP2021-114675 filed Jul. 11, 2021 the disclosure of which is expressly incorporated herein by reference, in its entirety, for any purpose.

BACKGROUND OF THE INVENTION

1. Field of the Invention

At least one embodiment of the present invention relates to a non-transitory computer readable medium storing a plan processing program and a task processing system.

2. Description of Related Art

In the related art, various technologies for performing a movement control of a character in a video game have been suggested.

JP-A-2012-213485 discloses a game program. The game program causes a computer to function as decision means for deciding arrangement of through candidate positions through which a non-player character not operated by a game player can pass in a search region, from a movement starting position of the non-player character and an objective position of movement of the non-player character in a virtual game space. The game program causes the computer to function as route selection means for selecting a route from the movement starting position to the objective position based on the through candidate positions of which the arrangement is decided by the decision means. The game program causes the computer to function as character control means for moving the non-player character to the objective position in accordance with the route selected by the route selection means. The decision means reads out search route information that is information about a plurality of through candidate positions corresponding to the virtual game space, from a storage unit and decides the arrangement of the through candidate positions of the search region based on the search route information such that an interval between through candidate positions arranged outside a predetermined range of the search region is greater than an interval between through candidate positions arranged within the predetermined range.

SUMMARY OF THE INVENTION

A hierarchical task network (abbreviated to HTN) has been used as a method of controlling a character by automatically deciding a task to be executed by the character in a video game. The hierarchical task network holds a set of tasks that may be executed under a predetermined condition, as a domain and can decide a plan for executing tasks corresponding to a situation of a world state in an appropriate execution order by recognizing the situation of the world state at the current point in time.

For example, in a game or the like, an environment may change between a time of generation of the plan and a time of execution of the plan. For example, in the middle of executing a series of tasks for performing a ranged attack on an enemy character by a control target character, in a case where the enemy character retreats outside an effective range, the control target character cannot continue executing the task of performing the ranged attack. In a case where the environment changes after the plan is generated, planning based on the existing hierarchical task network does not have means for adapting the already generated plan well to the environmental change. Thus, regeneration of the plan (replanning) occurs. In a case where this replanning is frequently performed, the control target character may lose long-term consistency.

An object of at least one embodiment of the present invention is to solve the above problem and implement planning that can flexibly handle an environmental change based on a hierarchical task network.

From a non-limiting viewpoint, a non-transitory computer readable medium according to one embodiment of the present invention is a non-transitory computer readable medium storing a plan processing program for planning a task executed by a character based on a hierarchical task network, the plan processing program causing a server to implement a plan generation function of generating a plan configured with a plurality of tasks from a domain based on goal information, in which in the plan generation function, a function of generating the plan in which a subsequent task to be employed is configured to change in accordance with a state or a condition is implemented.

From a non-limiting viewpoint, a task processing system according to one embodiment of the present invention is a task processing system that includes a communication network, a server, and a user terminal and plans a task executed by a character based on a hierarchical task network, the task processing system including plan generation means for generating a plan configured with a plurality of tasks from a domain based on goal information, in which in the plan generation means, the plan in which a subsequent task to be employed is configured to change in accordance with a state or a condition is generated.

From a non-limiting viewpoint, a non-transitory computer readable medium according to one embodiment of the present invention is a non-transitory computer readable medium storing a plan processing program for planning a task executed by a character based on a hierarchical task network, the plan processing program causing a user terminal to implement a plan generation function of generating a plan configured with a plurality of tasks from a domain based on goal information, in which in the plan generation function, a function of generating the plan in which a subsequent task to be employed is configured to change in accordance with a state or a condition is implemented.

Each embodiment of the present application solves one or two or more deficiencies.

BRIEF DESCRIPTION OF THE DRAWINGS

FIG. 37 is a conceptual diagram illustrating decomposition of the task in the implementation example of the plan according to at least one embodiment of the present invention.

DESCRIPTION OF EMBODIMENTS

Hereinafter, an example of embodiments of the present invention will be described with reference to the drawings. Various constituents in the example of each embodiment described below can be appropriately combined without contradiction or the like. In addition, contents described as an example of a certain embodiment may not be described in other embodiments. In addition, contents of operations or processes not related to a characteristic part of each embodiment may be omitted. Furthermore, an order of various processes constituting various flows or sequences described below may be changed without contradiction or the like in process contents.

First Embodiment

A summary of a first embodiment of the present invention will be described. Hereinafter, a plan processing program executed in a server that is an example of a computer will be illustratively described as the first embodiment.

Figure 1:
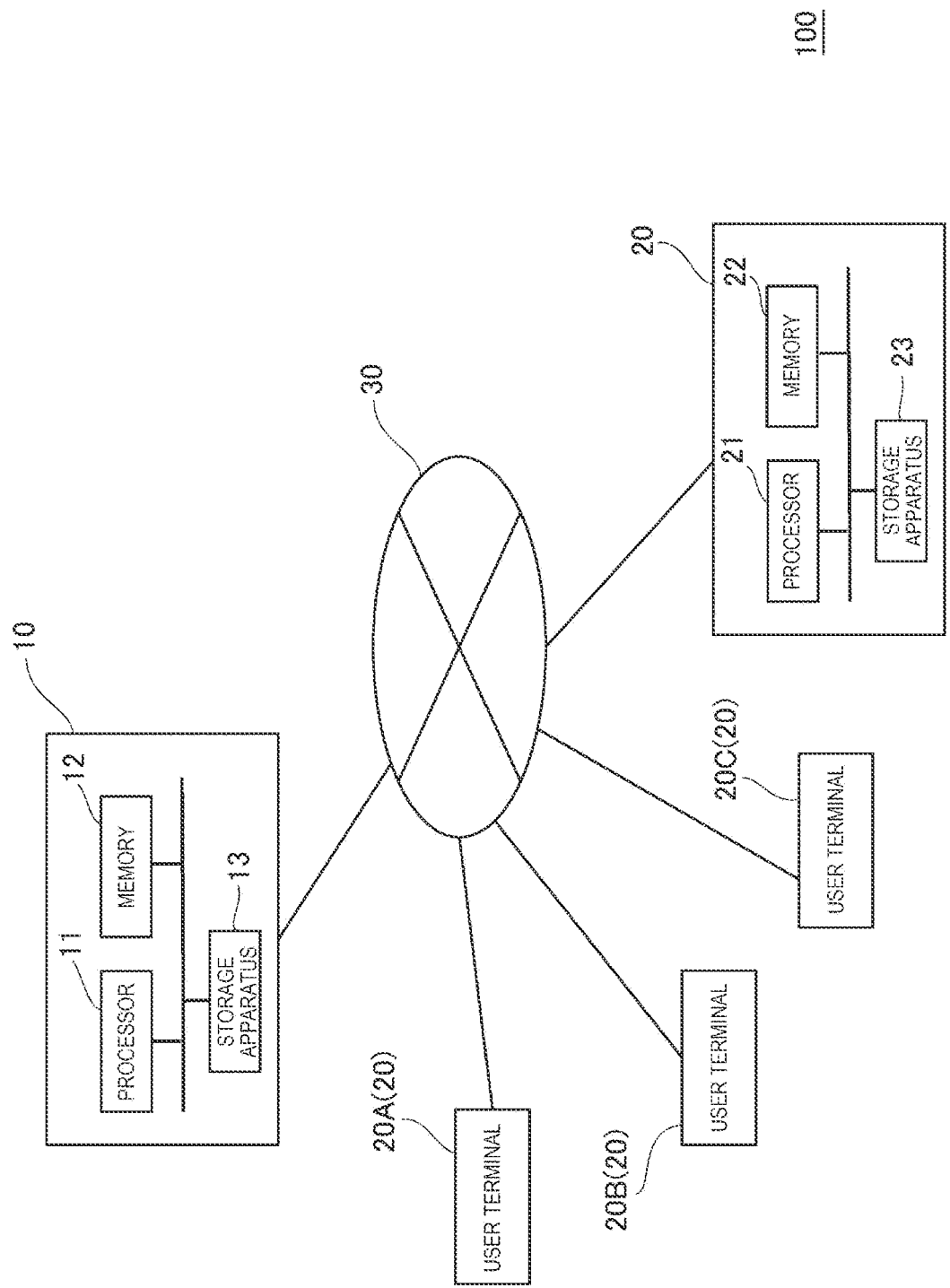
FIG. 1 is a block diagram illustrating an example of a configuration of a video game processing system according to at least one embodiment of the present invention.

FIG. 1 is a block diagram illustrating an example of a configuration of a video game processing system 100 according to at least one embodiment of the present invention. The video game processing system 100 includes a video game processing server 10 (server 10) and a user terminal 20 used by a user (player or the like of a game) of the video game processing system 100. Each of user terminals 20A, 20B, and 20C is an example of the user terminal 20. The configuration of the video game processing system 100 is not limited thereto. For example, the video game processing system 100 may have a configuration in which a plurality of users use a single user terminal. The video game processing system 100 may include a plurality of servers.

The server 10 and the user terminal 20 are an example of the computer. Each of the server 10 and the user terminal 20 is communicably connected to a communication network 30 such as the Internet. Connection between the communication network 30 and the server 10 and connection between the communication network 30 and the user terminal 20 may be wired connection or wireless connection. For example, the user terminal 20 may be connected to the communication network 30 by performing data communication with a base station managed by a communication service provider using a wireless communication line.

The video game processing system 100, by including the server 10 and the user terminal 20, implements various functions for executing various processes in accordance with an operation of the user.

The server 10 controls progress of a video game. The server 10 is managed by a manager of the video game processing system 100 and has various functions for providing information related to various processes to a plurality of user terminals 20.

The server 10 includes a processor 11, a memory 12, and a storage apparatus 13. For example, the processor 11 is a central processing apparatus such as a central processing unit (CPU) that performs various calculations 12) and controls. In addition, in a case where the server 10 includes a graphics processing unit (GPU), the GPU may perform a part of the various calculations and controls. The server 10 executes various information processes by the processor 11 using data read into the memory 12 and stores obtained process results in the storage apparatus 13 as needed.

The storage apparatus 13 has a function as a storage medium storing various information. A configuration of the storage apparatus 13 is not particularly limited but is preferably a configuration capable of storing all of various information necessary for controls performed in the video game processing system 100 from a viewpoint of reducing a process load exerted on the user terminal 20. Such examples include an HDD and an SSD. However, the storage apparatus storing various information may have a storage region in an accessible state from the server 10 and, for example, may be configured to have a dedicated storage region outside the server 10.

The server 10 may be configured with an information processing apparatus such as a game server that can render a game image.

The user terminal 20 is managed by the user and is configured with a communication terminal capable of performing a network distribution type game. Examples of the communication terminal capable of performing the network distribution type game include a mobile phone terminal, a personal digital assistant (PDA), a portable game apparatus, VR goggles, AR glasses, smart glasses, an AR contact lens, and a so-called wearable apparatus. The configuration of the user terminal that may be included in the video game processing system 100 is not limited thereto and may be a configuration in which the user may recognize a combined image. Other examples of the configuration of the user terminal include a combination of various communication terminals, a personal computer, and a stationary game apparatus.

The user terminal 20 is connected to the communication network 30 and includes hardware (for example, a display apparatus that displays a browser screen corresponding to coordinates or a game screen) and software for executing various processes by communicating with the server 10. Each of the plurality of user terminals 20 may be configured to be capable of directly communicating with each other without the server 10.

The user terminal 20 may incorporate a display apparatus. In addition, the display apparatus may be connected to the user terminal 20 in a wireless or wired manner. The display apparatus is a very general configuration and thus, will not be illustrated here. For example, the game screen is displayed by the display apparatus as the combined image, and the user recognizes the combined image. For example, the game screen is displayed on a display that is an example of the display apparatus included in the user terminal, or a display that is an example of the display apparatus connected to the user terminal. Examples of the display apparatus include a hologram display apparatus that can perform hologram display, a projection apparatus that projects images (including the game screen) to a screen or the like, and an apparatus that performs XR display. XR includes virtual reality (VR), augmented reality (AR), mixed reality (MR), substitutional reality (SR), and the like.

The user terminal 20 includes a processor 21, a memory 22, and a storage apparatus 23. For example, the processor 21 is a central processing apparatus such as a central processing unit (CPU) that performs various calculations and controls. In addition, in a case where the user terminal 20 includes a graphics processing unit (GPU), the GPU may perform a part of the various calculations and controls. The user terminal 20 executes various information processes by the processor 21 using data read into the memory 22 and stores obtained process results in the storage apparatus 23 as needed. The storage apparatus 23 has a function as a storage medium storing various information.

The user terminal 20 may incorporate an input apparatus. In addition, the input apparatus may be connected to the user terminal 20 in a wireless or wired manner. The input apparatus receives an operation input provided by the user. The processor included in the server 10 or the processor included in the user terminal 20 executes various control processes in accordance with the operation input provided by the user. Examples of the input apparatus include a touch panel screen included in a mobile phone terminal or a controller connected to AR glasses in a wireless or wired manner. In addition, a camera included in the user terminal 20 may correspond to the input apparatus. The user provides the operation input (gesture input) by a gesture such as moving a hand in front of the camera.

Besides, the user terminal 20 may include another output apparatus such as a speaker. The other output apparatus outputs voice or other various information to the user.

Figure 2:
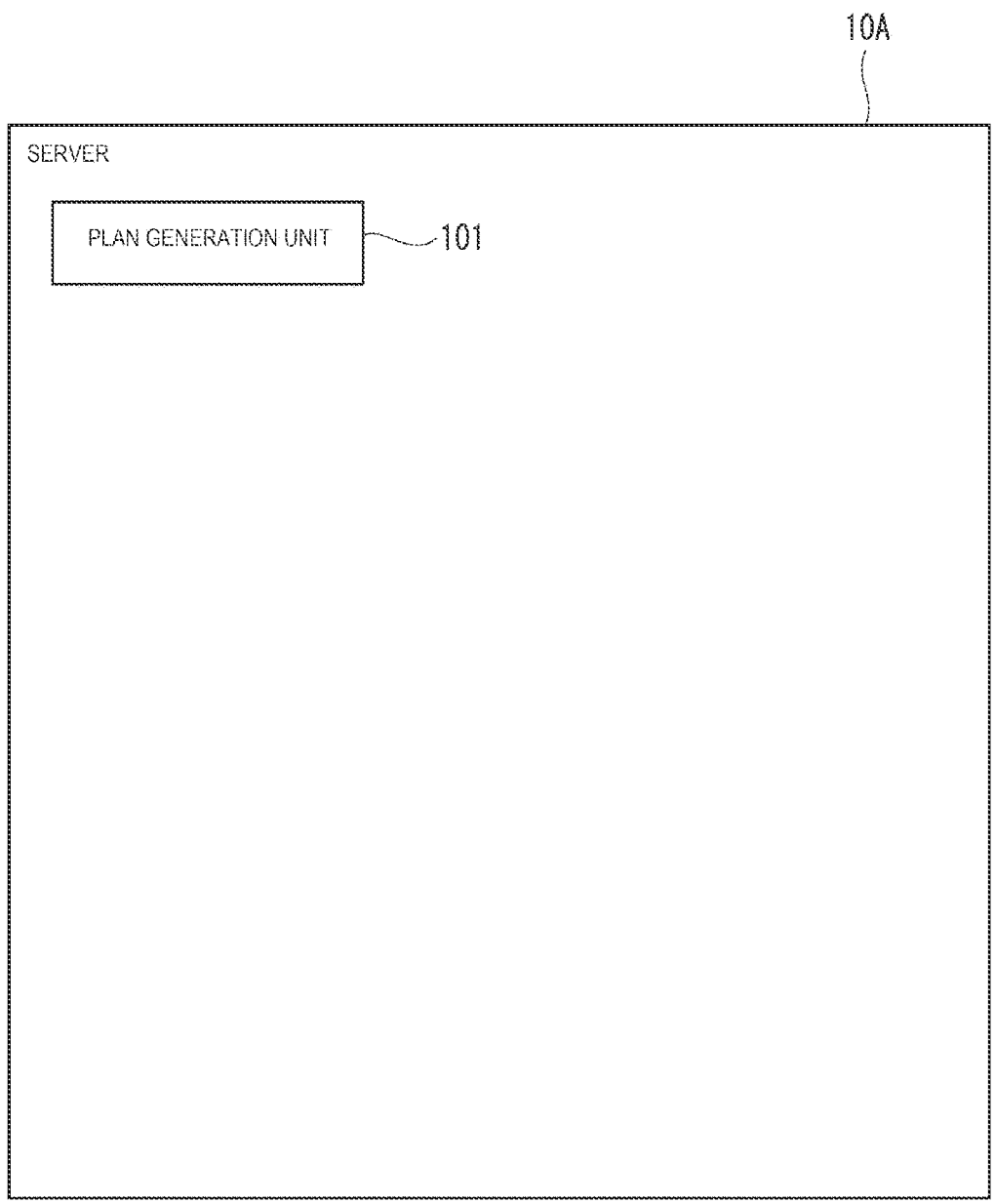
FIG. 2 is a block diagram illustrating a configuration of a server according to at least one embodiment of the present invention.

FIG. 2 is a block diagram illustrating a configuration of the server according to at least one embodiment of the present invention. A server 10A that is an example of a configuration of the server 10 includes at least a plan generation unit 101. The processor included in the server 10A functionally implements the plan generation unit 101 by referring to the plan processing program held in the storage apparatus and executing the program.

The plan generation unit 101 has a function of generating a plan configured with a plurality of tasks from a domain based on goal information. The plan generation unit 101 has a function of generating a plan in which a subsequent task to be employed is configured to change in accordance with a state or a condition.

Figure 3:
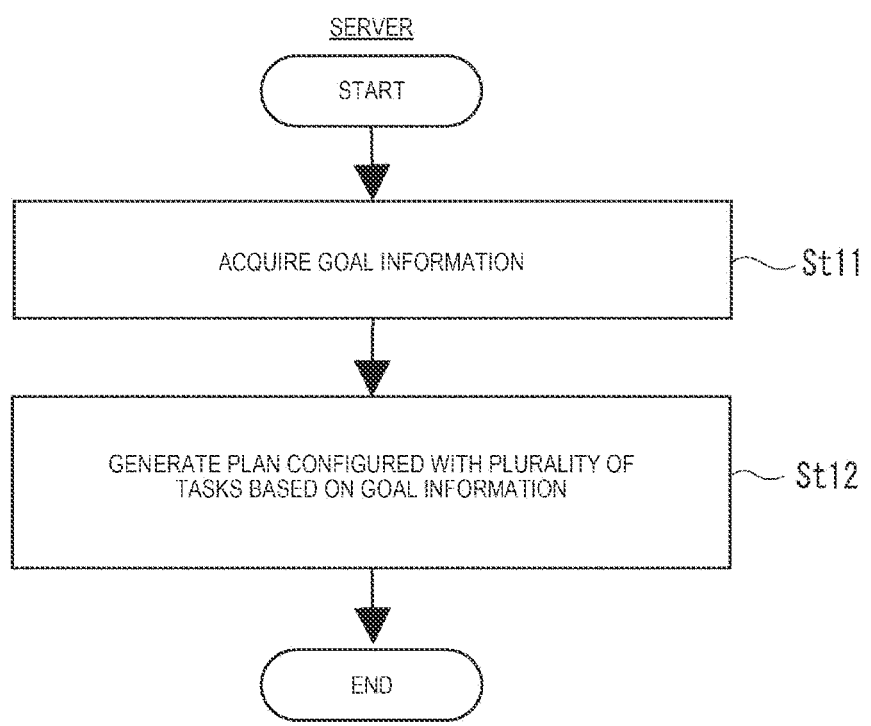
FIG. 3 is a flowchart illustrating a process example of a plan processing program according to at least one embodiment of the present invention.

Next, a program execution process in the first embodiment of the present invention will be described. FIG. 3 is a flowchart illustrating a process example of the plan processing program according to at least one embodiment of the present invention.

The plan generation unit 101 acquires the goal information (St11). The plan generation unit 101 generates the plan configured with the plurality of tasks from the domain based on the acquired goal information (St12). Here, the plan generation unit 101 generates the plan in which the subsequent task to be employed is configured to change in accordance with the state or the condition.

The plan processing program executed by the server 10A plans a task executed by a character based on a hierarchical task network. Planning the task executed by the character based on the hierarchical task network refers to constructing a plan configured with the task executed by the character using the hierarchical task network. The character refers to a target (control target character) of which a behavior is controlled based on the constructed plan. For example, a character (non-player character) that appears in the game and cannot be operated by the user corresponds to the control target character. However, the character is not limited to a humanoid character. Various objects such as a vehicle, a machine, and a castle appearing in the game may correspond to the control target character.

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

As one aspect of the first embodiment, planning that can flexibly handle an environmental change can be performed based on the hierarchical task network.

Second Embodiment

A summary of a second embodiment of the present invention will be described. Hereinafter, a plan processing program executed in a server that is an example of a computer will be illustratively described as the second embodiment. The server may be the server 10 included in the video game processing system 100 illustrated in FIG. 1.

Figure 4:
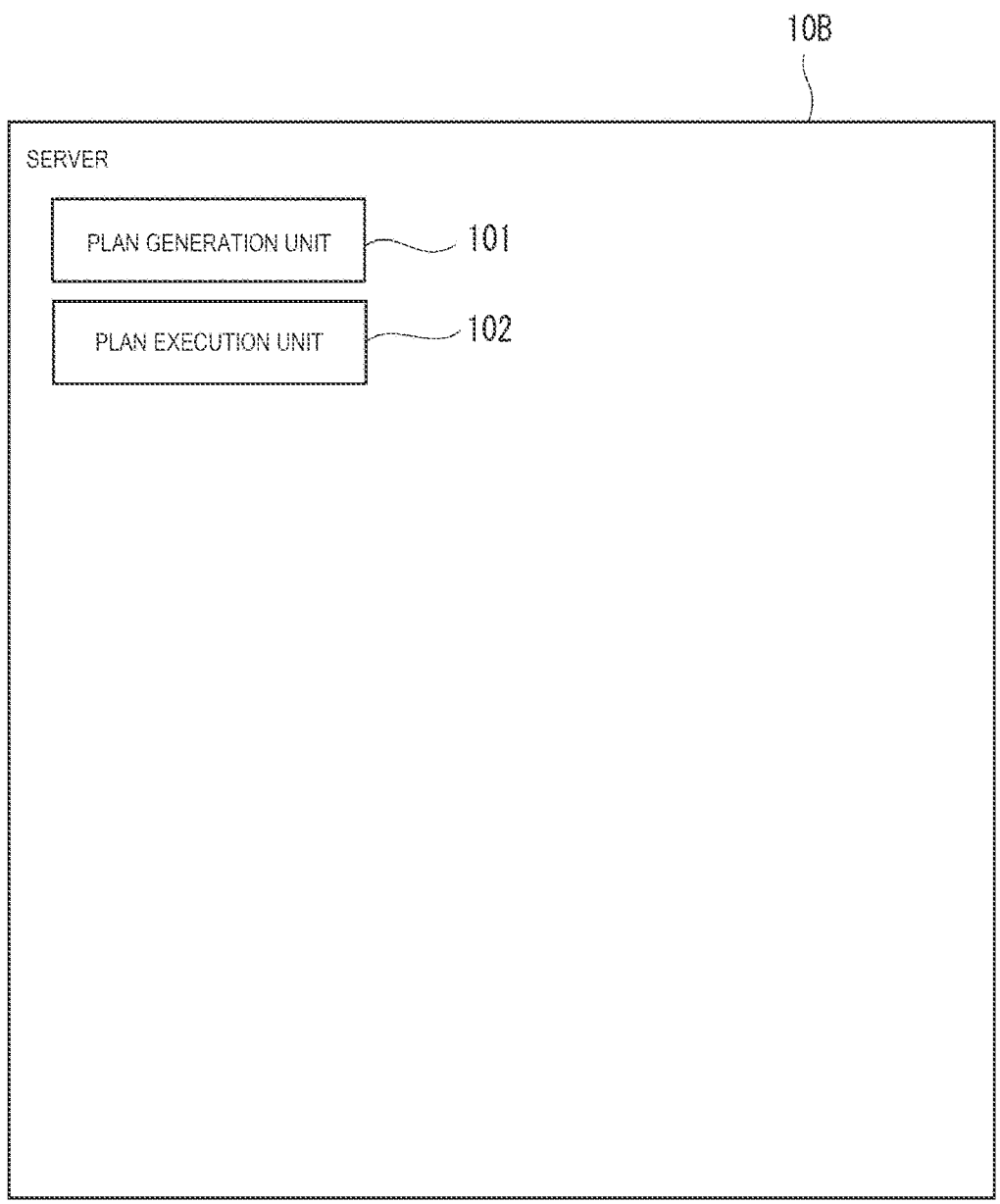
FIG. 4 is a block diagram illustrating a configuration of the server according to at least one embodiment of the present invention.

FIG. 4 is a block diagram illustrating a configuration of the server according to at least one embodiment of the present invention. A server 10B that is an example of the configuration of the server 10 includes at least the plan generation unit 101 and a plan execution unit 102. The processor included in the server 10B functionally implements the plan generation unit 101 and the plan execution unit 102 by referring to the plan processing program held in the storage apparatus and executing the program.

The plan generation unit 101 has a function of generating a plan configured with a plurality of tasks from a domain based on goal information. The plan generation unit 101 has a function of generating a plan in which a subsequent task to be employed is configured to change in accordance with a state or a condition.

The plan execution unit 102 has a function of acquiring the plan generated by the plan generation unit 101 and sequentially executing the tasks included in the plan. The plan execution unit has a function of sequentially executing the tasks included in the plan after changing a part of the acquired plan.

Figure 5:
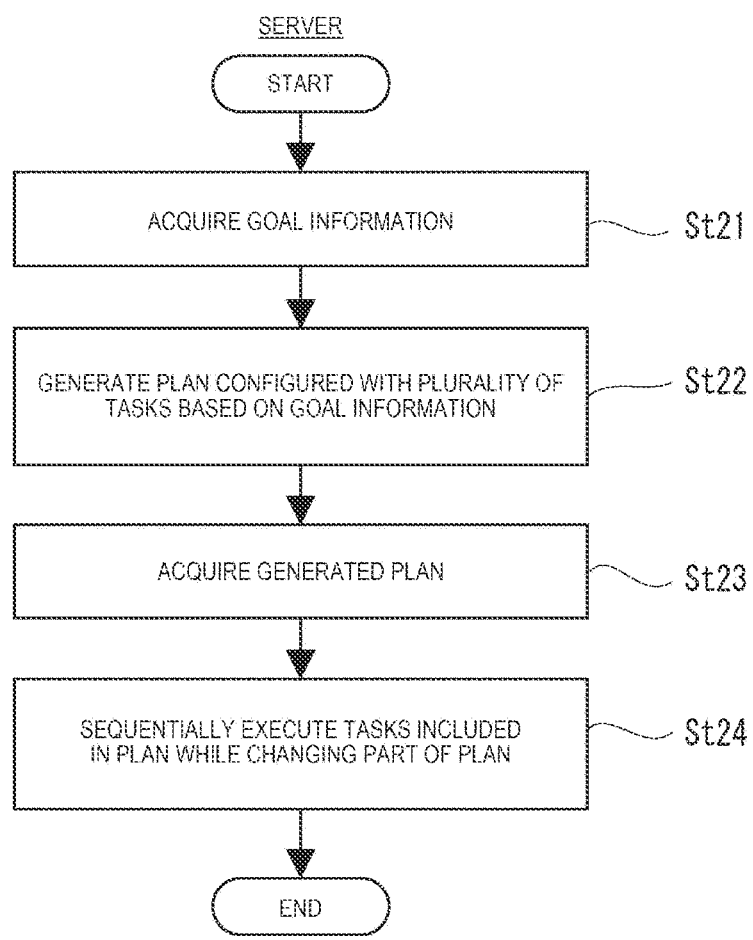
FIG. 5 is a flowchart illustrating a process example of the plan processing program according to at least one embodiment of the present invention.

Next, a program execution process in the second embodiment of the present invention will be described. FIG. 5 is a flowchart illustrating a process example of the plan processing program according to at least one embodiment of the present invention.

The plan generation unit 101 acquires the goal information (St21). The plan generation unit 101 generates the plan configured with the plurality of tasks from the domain based on the acquired goal information (St22). Here, the plan generation unit 101 generates the plan in which the subsequent task to be employed is configured to change in accordance with the state or the condition.

The plan execution unit 102 acquires the plan generated by the plan generation unit 101 (St23). The plan execution unit 102 sequentially executes the tasks included in the plan while changing a part of the acquired plan (St24).

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

For example, changing a part of the acquired plan includes modifying, replacing, or deleting a part of the tasks included in the acquired plan. Changing a part of the acquired plan may include adding a new task to the plan. Changing a part of the acquired plan may include suspending execution of a task included in the acquired plan.

As one aspect of the second embodiment, an execution entity (for example, the control target character) of the task can be flexibly controlled.

Third Embodiment

A summary of a third embodiment of the present invention will be described. Hereinafter, a plan processing program executed in a server which is an example of a computer will be illustratively described as the third embodiment. The server may be the server 10 included in the video game processing system 100 illustrated in FIG. 1.

Figure 6:
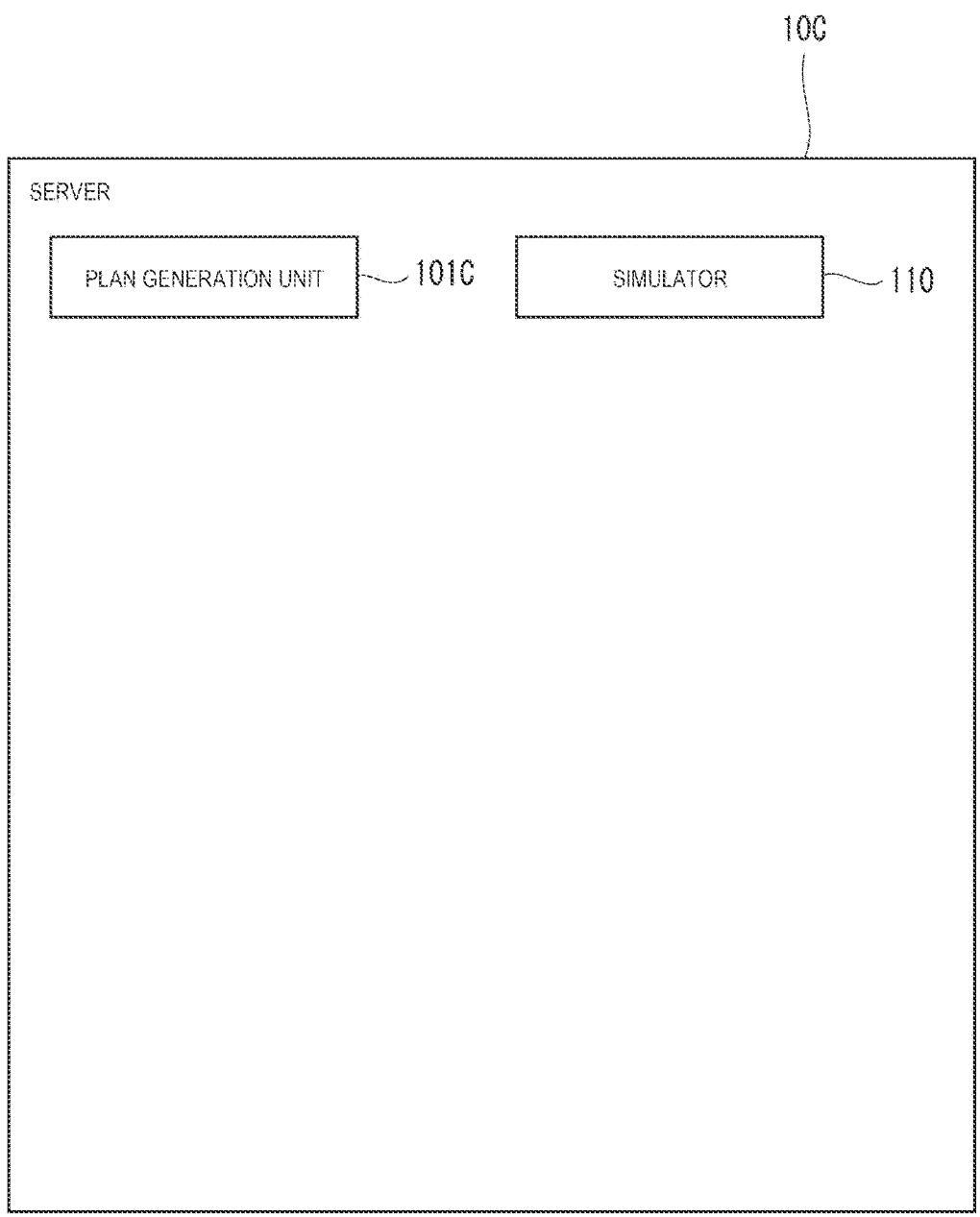
FIG. 6 is a block diagram illustrating a configuration of the server according to at least one embodiment of the present invention.

FIG. 6 is a block diagram illustrating a configuration of the server according to at least one embodiment of the present invention. A server 10C that is an example of the configuration of the server 10 includes at least a plan generation unit 101C and a simulator 110. The processor included in the server 10C functionally implements the plan generation unit 101C and the simulator 110 by referring to the plan processing program held in the storage apparatus and executing the program.

The plan generation unit 101C has a function of generating a plan configured with a plurality of tasks from a domain based on goal information. The plan generation unit 101C has a function of generating a plan in which a subsequent task to be employed is configured to change in accordance with a state or a condition.

The plan generation unit 101C has a function of calculating an evaluation value by tentatively executing a plurality of selectable tasks included in the domain by the simulator 110 and generating the plan based on the goal information and the evaluation value.

Figure 7:
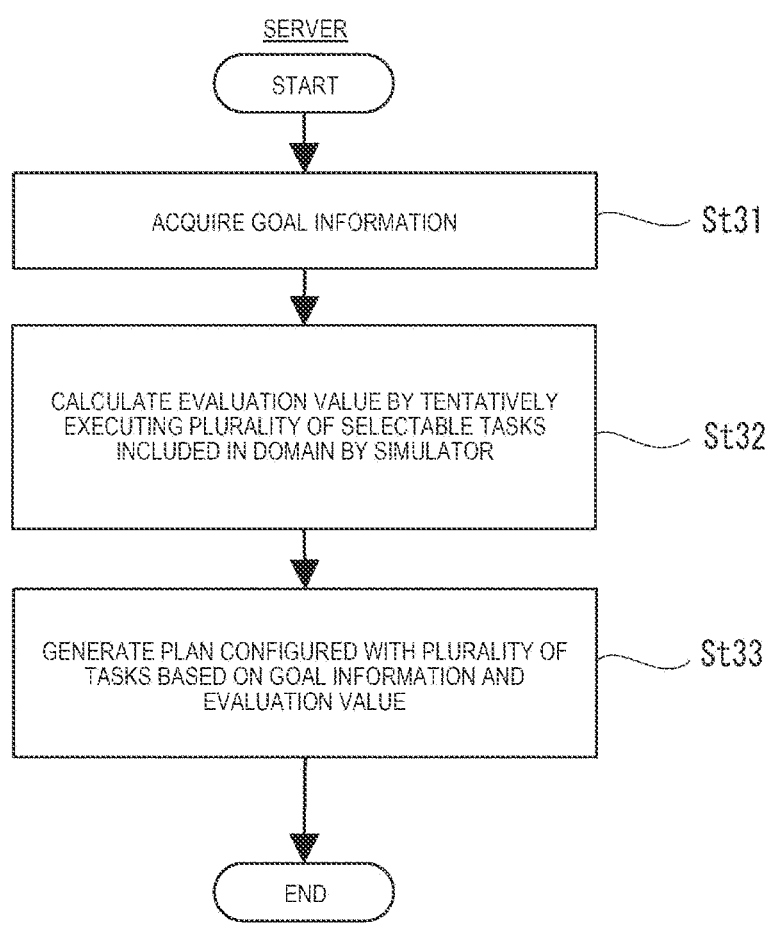
FIG. 7 is a flowchart illustrating a process example of the plan processing program according to at least one embodiment of the present invention.

Next, a program execution process in the third embodiment of the present invention will be described. FIG. 7 is a flowchart illustrating a process example of the plan processing program according to at least one embodiment of the present invention.

The plan generation unit 101C acquires the goal information (St31). The plan generation unit 101C calculates the evaluation value by tentatively executing the plurality of selectable tasks included in the domain by the simulator 110 (St32). The plan generation unit 101C generates the plan configured with the plurality of tasks from the domain based on the acquired goal information and the calculated evaluation value (St33). Here, the plan generation unit 101C generates the plan in which the subsequent task to be employed is configured to change in accordance with the state or the condition.

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

The simulator refers to a program, an apparatus, a system, or a combination thereof that tentatively executes execution of the task.

As one aspect of the third embodiment, since plan generation is performed based on logical inference, performing simulation enables planning to be performed after a situation change corresponding to task execution is predicted.

Fourth Embodiment

A summary of a fourth embodiment of the present invention will be described. Hereinafter, a plan processing program executed in a server which is an example of a computer will be illustratively described as the fourth embodiment. The server may be the server 10 included in the video game processing system 100 illustrated in FIG. 1.

Figure 8:
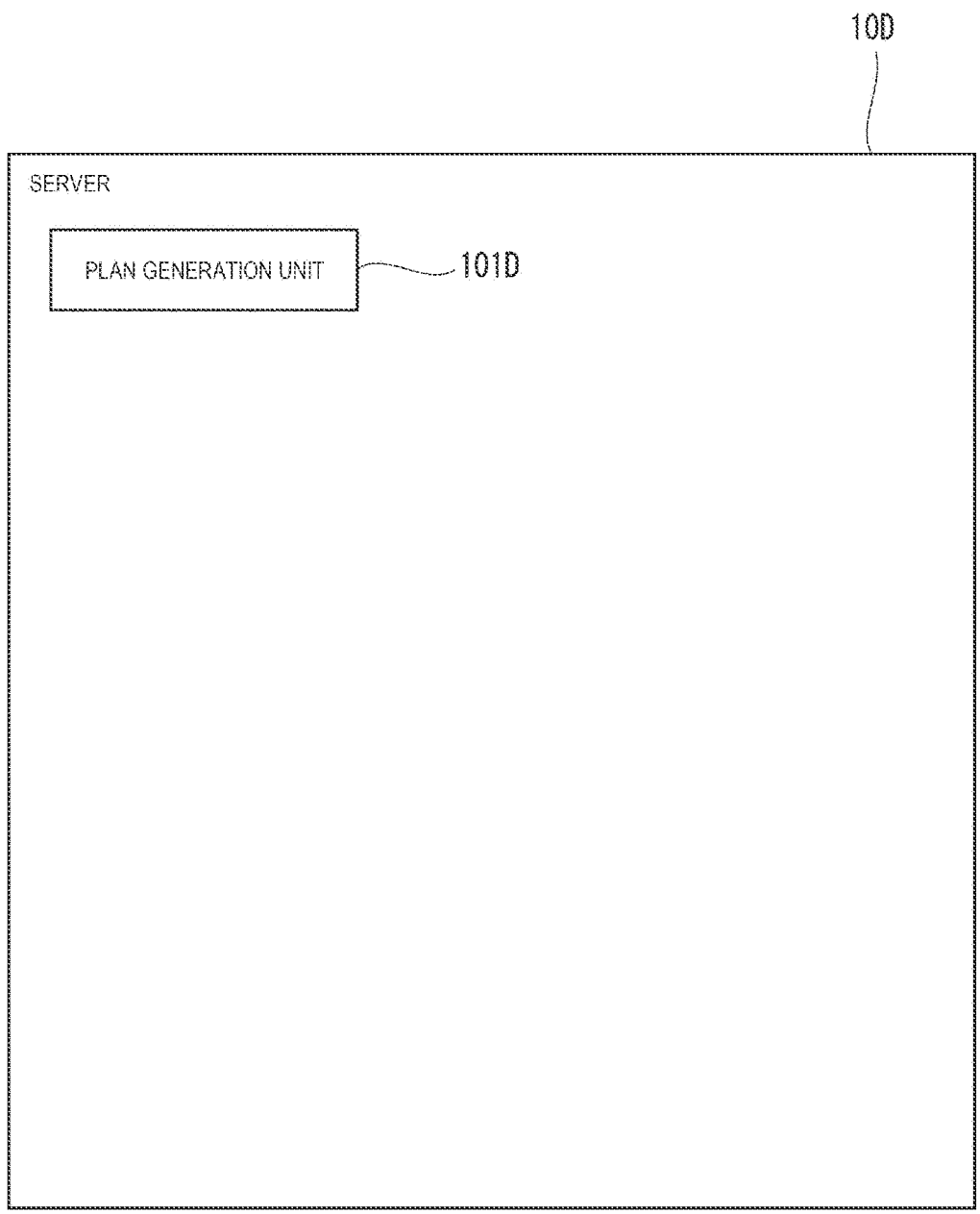
FIG. 8 is a block diagram illustrating a configuration of the server according to at least one embodiment of the present invention.

FIG. 8 is a block diagram illustrating a configuration of the server according to at least one embodiment of the present invention. A server 10D that is an example of a configuration of the server 10 includes at least a plan generation unit 101D. The processor included in the server 10D functionally implements the plan generation unit 101D by referring to the plan processing program held in the storage apparatus and executing the program.

The plan generation unit 101D has a function of generating a plan configured with a plurality of tasks from a domain based on goal information. The plan generation unit 101D has a function of generating a plan in which a subsequent task to be employed is configured to change in accordance with a state or a condition.

The plan generation unit 101D has a function of generating the plan from the domain based on the goal information and task execution, an action, or a state change of an object other than the control target character.

Figure 9:
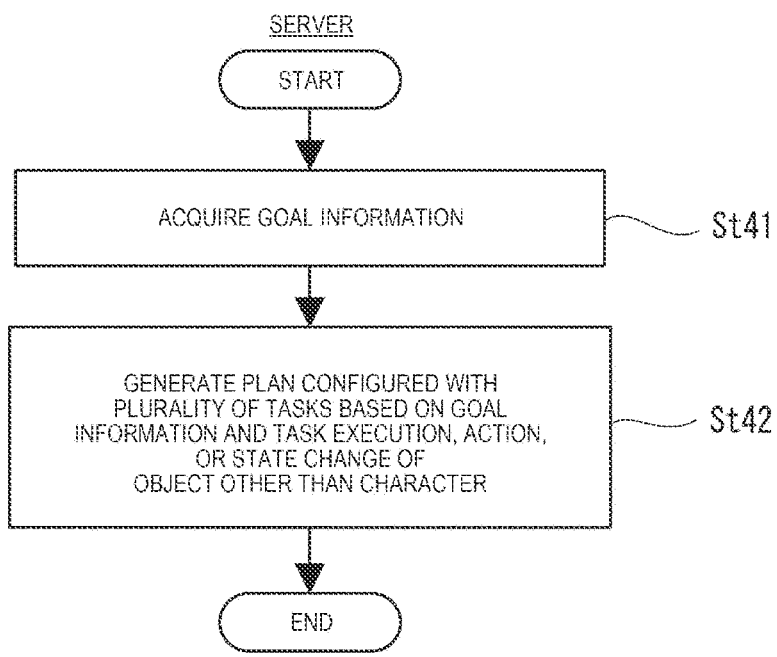
FIG. 9 is a flowchart illustrating a process example of the plan processing program according to at least one embodiment of the present invention.

Next, a program execution process in the fourth embodiment of the present invention will be described. FIG. 9 is a flowchart illustrating a process example of the plan processing program according to at least one embodiment of the present invention.

The plan generation unit 101D acquires the goal information (St41). The plan generation unit 101D generates the plan configured with the plurality of tasks from the domain based on the acquired goal information and the task execution, the action, or the state change of the object other than the control target character (St42). Here, the plan generation unit 101D generates the plan in which the subsequent task to be employed is configured to change in accordance with the state or the condition.

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

The character in "object other than the character" means a character controlled based on the plan generated by the plan generation unit 101D. The character will be referred to as the control target character for convenience.

The object other than the character means an object different from the control target character. The object includes a character different from the control target character. For example, in a game including a fighting element, a character (enemy character) that is an adversary to the control target character is included in the object other than the character. A character (allied character) that cooperates with the control target character is also included in the object other than the character. In addition, any object other than the character, for example, an automobile object or a building object appearing in the game, is included in the object other than the character. The object other than the character may be a game world (game object) to which the control target character belongs.

The object other than the character may be an object that can execute the task. The object other than the character may be an object that can execute the action. For example, the enemy character can execute the task and can also execute the action.

The task execution, the action, or the state change of the object other than the control target character may or may not correspond to the task execution by the control target character.

As one aspect of the fourth embodiment, planning that can flexibly handle an environmental change caused by the object (for example, the enemy character) other than the control target character can be performed.

Fifth Embodiment

A summary of a fifth embodiment of the present invention will be described. Hereinafter, a plan processing system will be illustratively described as the fifth embodiment.

Figure 10:
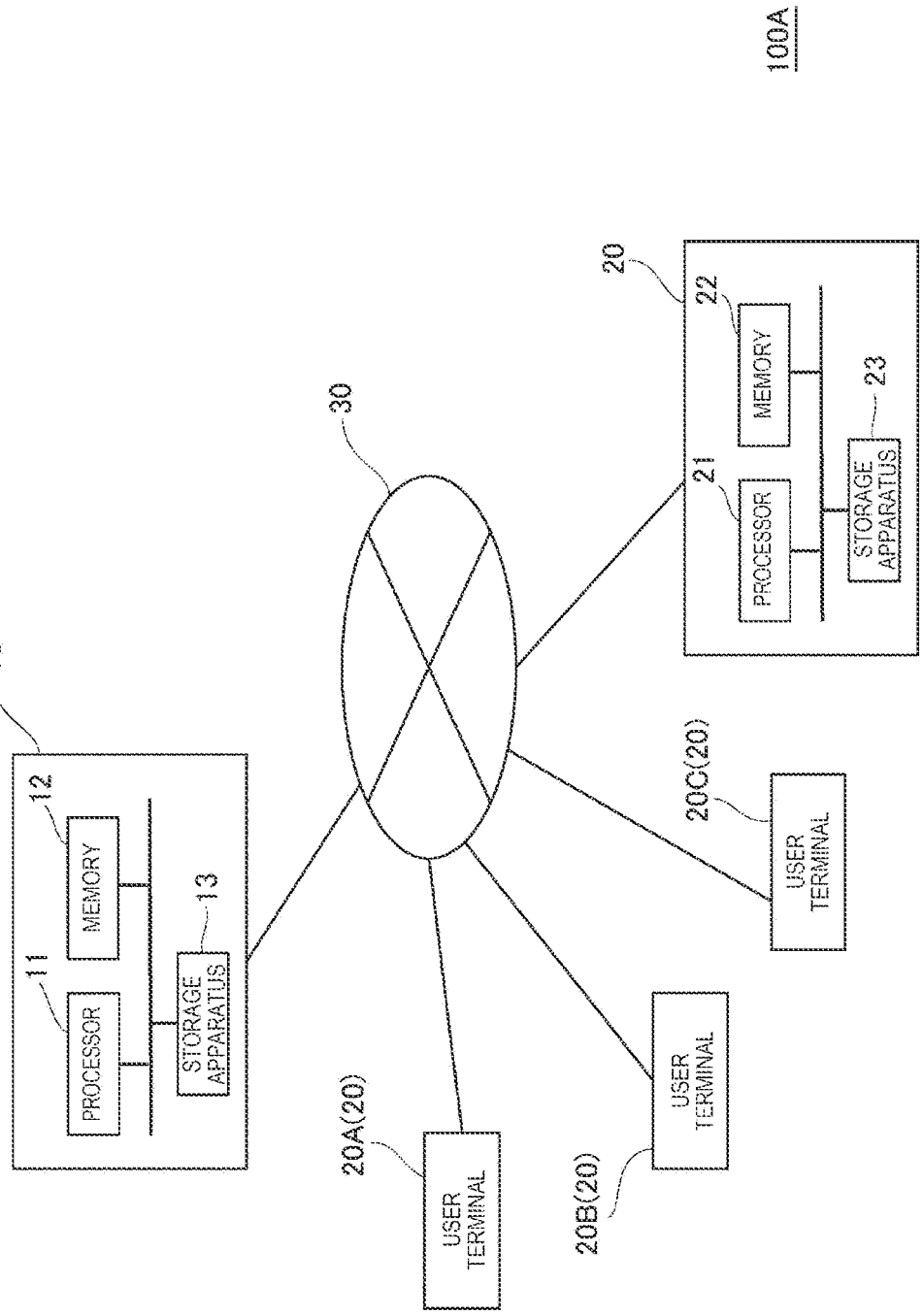
FIG. 10 is a block diagram illustrating an example of the configuration of the video game processing system according to at least one embodiment of the present invention.

FIG. 10 is a block diagram illustrating an example of a configuration of a video game processing system 100A according to at least one embodiment of the present invention. The video game processing system 100A that is an example of the plan processing system includes the video game processing server 10 (server 10) and the user terminal 20 used by a user (player or the like of a game) of the video game processing system 100A. Each of user terminals 20A, 20B, and 20C is an example of the user terminal 20. The configuration of the video game processing system 100A is not limited thereto. For example, the video game processing system 100A may have a configuration in which a plurality of users use a single user terminal. The video game processing system 100A may include a plurality of servers.

The server 10 and the user terminal 20 are an example of the computer. Each of the server 10 and the user terminal 20 is communicably connected to the communication network such as the Internet. Connection between the communication network 30 and the server 10 and connection between the communication network 30 and the user terminal 20 may be wired connection or wireless connection. For example, the user terminal 20 may be connected to the communication network 30 by performing data communication with a base station managed by a communication service provider using a wireless communication line.

The video game processing system 100A, by including the server 10 and the user terminal 20, implements various functions for executing various processes in accordance with an operation of the user.

The server 10 controls progress of the video game. The server 10 is managed by a manager of the video game processing system 100A and has various functions for providing information related to various processes to a plurality of user terminals 20.

The server 10 includes the processor 11, the memory 12, and the storage apparatus 13. For example, the processor 11 is a central processing apparatus such as a central processing unit (CPU) that performs various calculations and controls. In addition, in a case where the server 10 includes a graphics processing unit (GPU), the GPU may perform a part of the various calculations and controls. The server 10 executes various information processes by the processor 11 using data read into the memory 12 and stores obtained process results in the storage apparatus 13 as needed.

The storage apparatus 13 has a function as a storage medium storing various information. A configuration of the storage apparatus 13 is not particularly limited but is preferably a configuration capable of storing all of various information necessary for controls performed in the video game processing system 100A from a viewpoint of reducing a process load exerted on the user terminal 20. Such examples include an HDD and an SSD. However, the storage apparatus storing various information may have a storage region in an accessible state from the server 10 and, for example, may be configured to have a dedicated storage region outside the server 10.

The server 10 may be configured with an information processing apparatus such as a game server that can render a game image.

The user terminal 20 is managed by the user and is configured with a communication terminal capable of performing a network distribution type game. Examples of the communication terminal capable of performing the network distribution type game include a mobile phone terminal, a personal digital assistant (PDA), a portable game apparatus, VR goggles, AR glasses, smart glasses, an AR contact lens, and a so-called wearable apparatus. The configuration of the user terminal that may be included in the video game processing system 100A is not limited thereto and may be a configuration in which the user may recognize a combined image. Other examples of the configuration of the user terminal include a combination of various communication terminals, a personal computer, and a stationary game apparatus.

The user terminal 20 is connected to the communication network 30 and includes hardware (for example, a display apparatus that displays a browser screen corresponding to coordinates or a game screen) and software for executing various processes by communicating with the server 10.

Each of the plurality of user terminals 20 may be configured to be capable of directly communicating with each other without the server 10.

The user terminal 20 may incorporate a display apparatus. In addition, the display apparatus may be connected to the user terminal 20 in a wireless or wired manner. The display apparatus is a very general configuration and thus, will not be illustrated here. For example, the game screen is displayed by the display apparatus as the combined image, and the user recognizes the combined image. For example, the game screen is displayed on a display that is an example of the display apparatus included in the user terminal, or a display that is an example of the display apparatus connected to the user terminal. Examples of the display apparatus include a hologram display apparatus that can perform hologram display, a projection apparatus that projects images (including the game screen) to a screen or the like, and an apparatus that performs XR display. XR includes virtual reality (VR), augmented reality (AR), mixed reality (MR), substitutional reality (SR), and the like.

The user terminal 20 includes the processor 21, the memory 22, and the storage apparatus 23. For example, the processor 21 is a central processing apparatus such as a central processing unit (CPU) that performs various calculations and controls. In addition, in a case where the user terminal 20 includes a graphics processing unit (GPU), the GPU may perform a part of the various calculations and controls. The user terminal 20 executes various information processes by the processor 21 using data read into the memory 22 and stores obtained process results in the storage apparatus 23 as needed. The storage apparatus 23 has a function as a storage medium storing various information.

The user terminal 20 may incorporate an input apparatus. In addition, the input apparatus may be connected to the user terminal 20 in a wireless or wired manner. The input apparatus receives an operation input provided by the user. The processor included in the server 10 or the processor included in the user terminal 20 executes various control processes in accordance with the operation input provided by the user. Examples of the input apparatus include a touch panel screen included in a mobile phone terminal or a controller connected to AR glasses in a wireless or wired manner. In addition, a camera included in the user terminal 20 may correspond to the input apparatus. The user provides the operation input (gesture input) by a gesture such as moving a hand in front of the camera.

Besides, the user terminal 20 may include another output apparatus such as a speaker. The other output apparatus outputs voice or other various information to the user.

Figure 11:
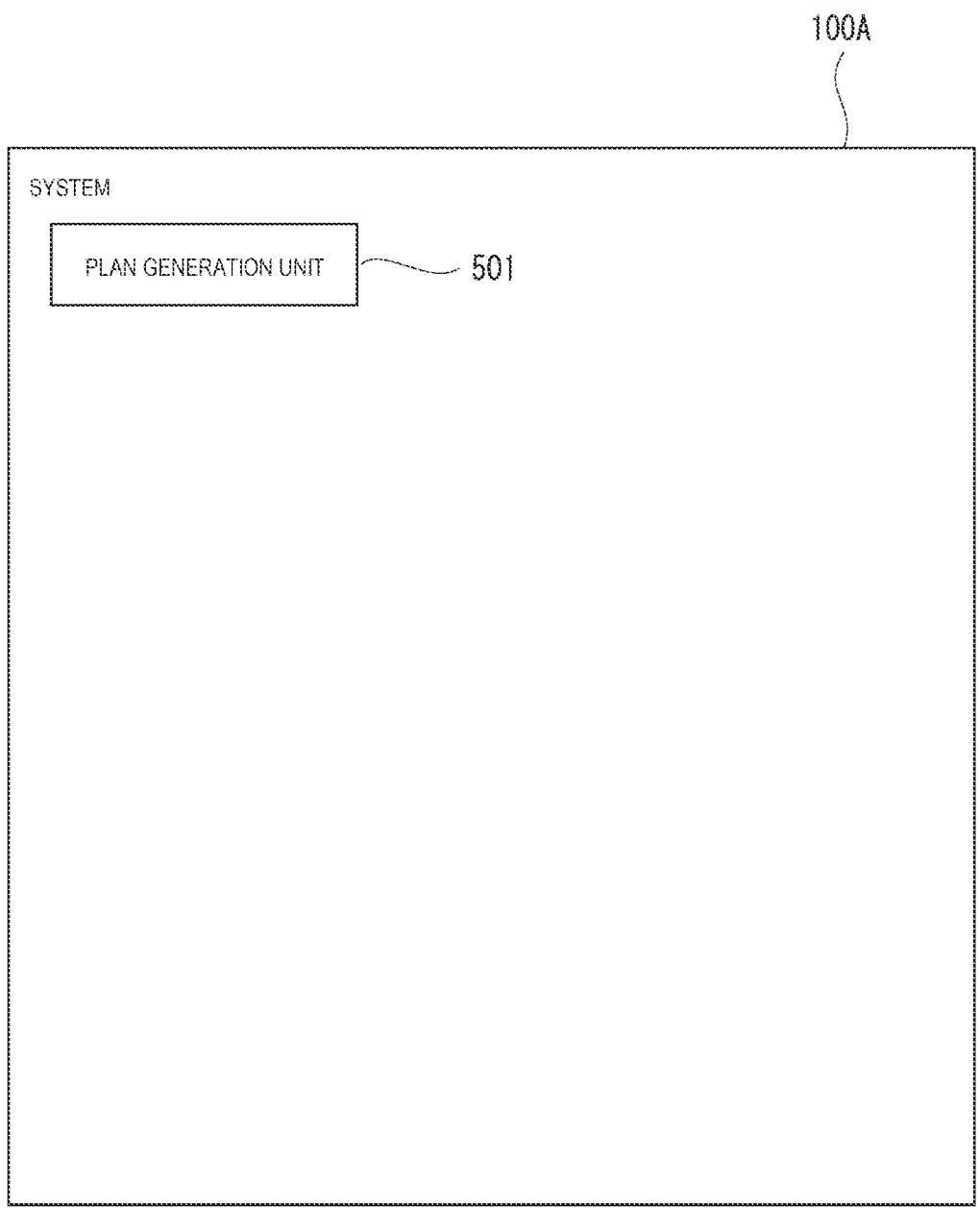
FIG. 11 is a block diagram illustrating a configuration of a plan processing system according to at least one embodiment of the present invention.

FIG. 11 is a block diagram illustrating a configuration of the plan processing system according to at least one embodiment of the present invention. The video game processing system 100A that is an example of the plan processing system includes at least a plan generation unit 501. One or more processors included in the video game processing system 100A functionally implement the plan generation unit 501 by referring to a plan processing program held in one or more storage apparatuses included in the video game processing system 100A and executing the program.

The plan generation unit 501 has a function of generating a plan configured with a plurality of tasks from a domain based on goal information. The plan generation unit 501 has a function of generating a plan in which a subsequent task to be employed is configured to change in accordance with a state or a condition.

Figure 12:
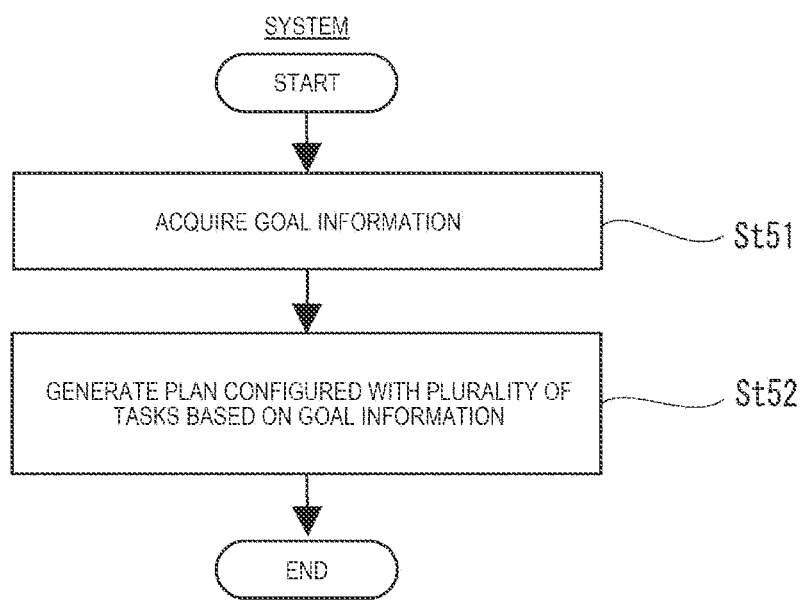
FIG. 12 is a flowchart illustrating an example of a plan process according to at least one embodiment of the present invention.

Next, a program execution process in the fifth embodiment of the present invention will be described. FIG. 12 is a flowchart illustrating an example of a plan process according to at least one embodiment of the present invention.

The plan generation unit 501 acquires the goal information (St51). The plan generation unit 501 generates the plan configured with the plurality of tasks from the domain based on the acquired goal information (St52). Here, the plan generation unit 501 generates the plan in which the subsequent task to be employed is configured to change in accordance with the state or the condition.

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

As one aspect of the fifth embodiment, planning that can flexibly handle an environmental change can be performed based on the hierarchical task network.

Sixth Embodiment

A summary of a sixth embodiment of the present invention will be described. Hereinafter, a plan processing program executed in a user terminal will be illustratively described as the sixth embodiment. A user terminal 20X may be any of the plurality of user terminals 20 and 20A to 20C illustrated in FIG. 1 or FIG. 10.

Figure 13:
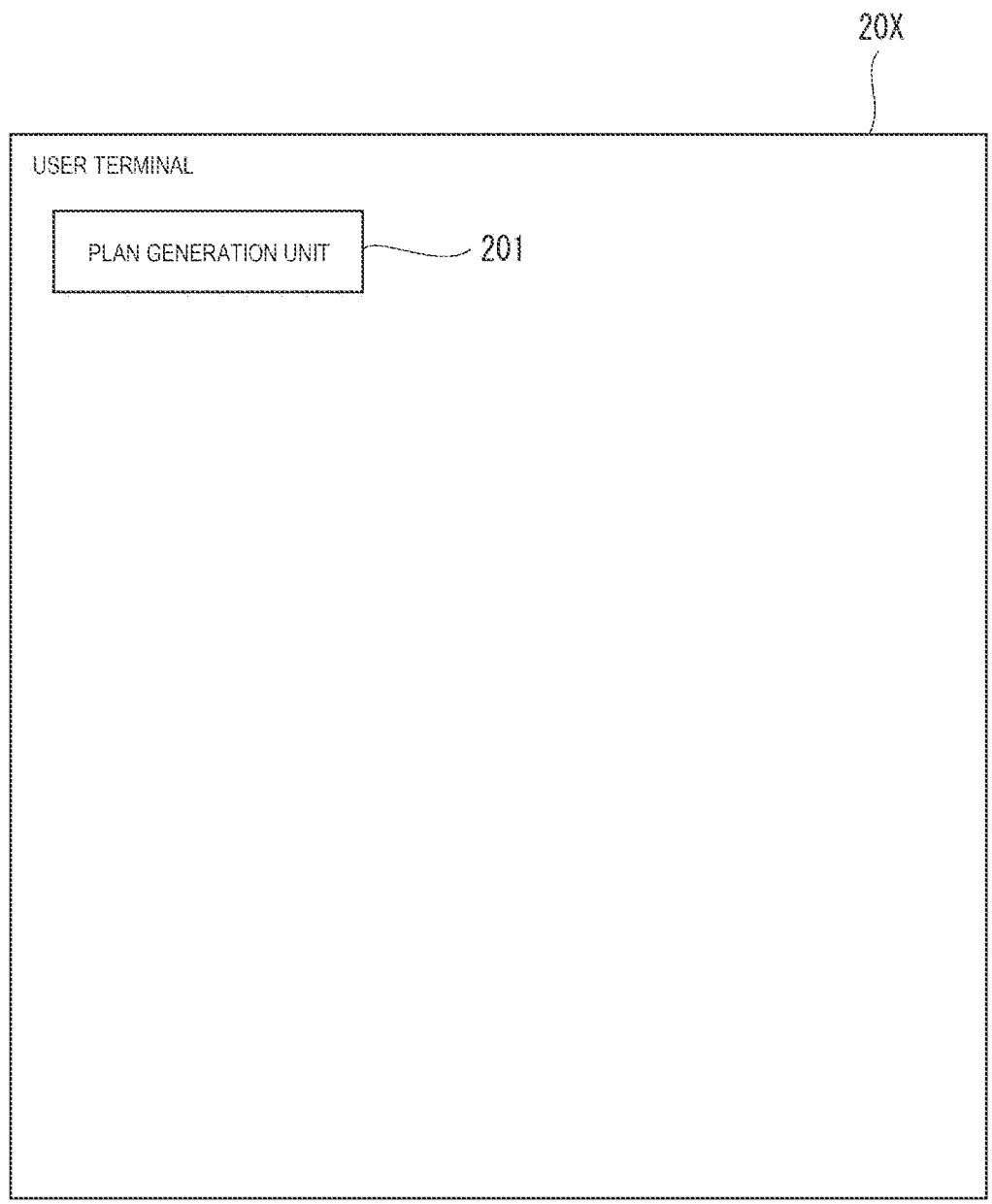
FIG. 13 is a block diagram illustrating a configuration of a user terminal according to at least one embodiment of the present invention.

FIG. 13 is a block diagram illustrating a configuration of the user terminal 20X according to at least one embodiment of the present invention. The user terminal 20X includes at least a plan generation unit 201. The processor included in the user terminal 20X functionally implements the plan generation unit 201 by referring to the plan processing program held in the storage apparatus and executing the program.

The plan generation unit 201 has a function of generating a plan configured with a plurality of tasks from a domain based on goal information. The plan generation unit 201 has a function of generating a plan in which a subsequent task to be employed is configured to change in accordance with a state or a condition.

Figure 14:
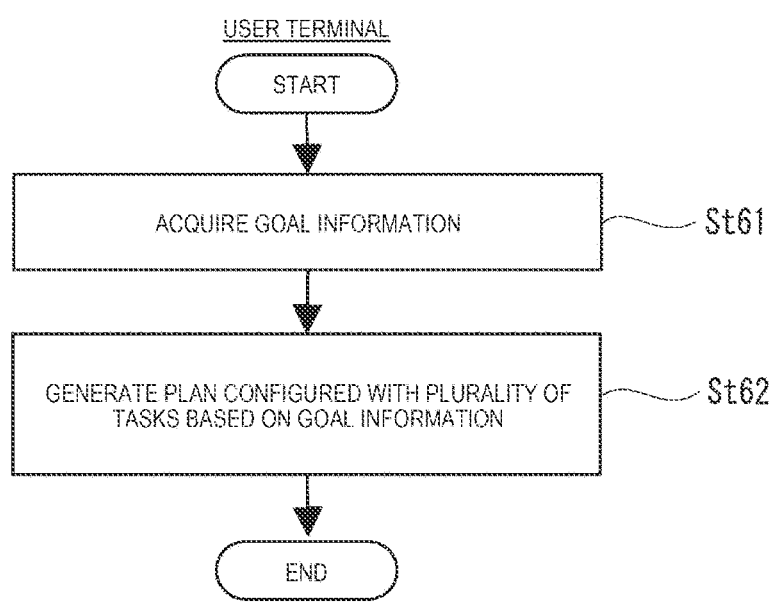
FIG. 14 is a flowchart illustrating an example of the plan process according to at least one embodiment of the present invention.

Next, a program execution process in the sixth embodiment of the present invention will be described. FIG. 14 is a flowchart illustrating an example of a plan process according to at least one embodiment of the present invention.

The plan generation unit 201 acquires the goal information (St61). The plan generation unit 201 generates the plan configured with the plurality of tasks from the domain based on the acquired goal information (St62). Here, the plan generation unit 201 generates the plan in which the subsequent task to be employed is configured to change in accordance with the state or the condition.

The goal information means data related to an objective accomplished by the control target character. For example, the goal information may be neutralization of an enemy or survival of the character. Other goal information may be set.

The task means a task executed by the control target character in the hierarchical task network or the like. The task includes a primitive task and a compound task.

The plan means a specific scheme generated by a planner.

The domain means a set of executable processes (tasks).

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

As one aspect of the sixth embodiment, planning that can flexibly handle an environmental change can be performed based on the hierarchical task network.

Seventh Embodiment

A summary of a seventh embodiment of the present invention will be described. Hereinafter, a plan processing program executed in a server will be illustratively described as the seventh embodiment. The server may be the server 10 illustrated in FIG. 1 or FIG. 10.

Figure 15:
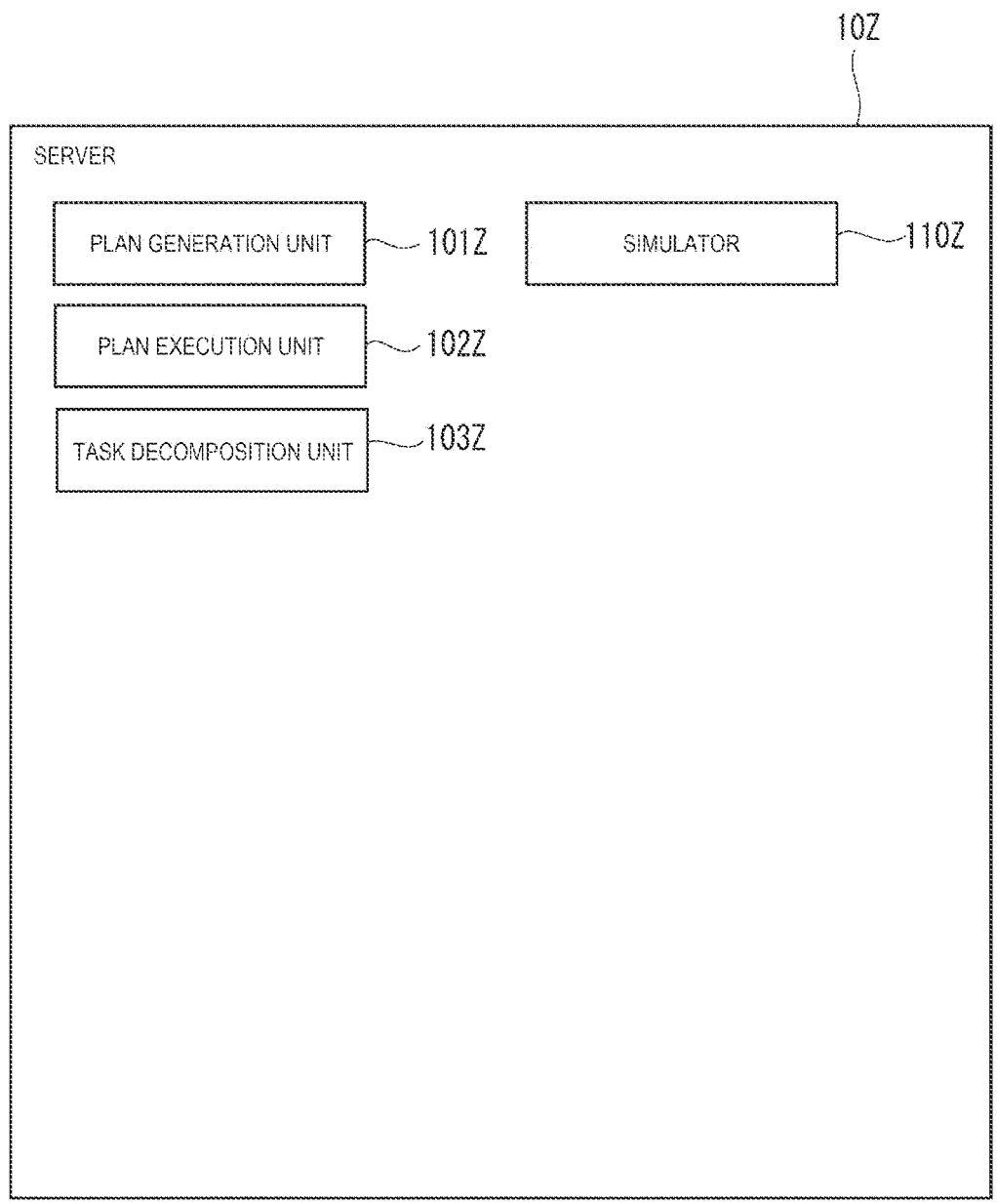
FIG. 15 is a block diagram illustrating a configuration of the server according to at least one embodiment of the present invention.

FIG. 15 is a block diagram illustrating a configuration of the server according to at least one embodiment of the present invention. A server 10Z that is an example of the configuration of the server 10 includes at least a plan generation unit 101Z, a plan execution unit 102Z, a task decomposition unit 103Z, and a simulator 110Z. The processor included in the server 10Z functionally implements the plan generation unit 101Z, the plan execution unit 102Z, the task decomposition unit 103Z, and the simulator 110Z by referring to the plan processing program held in the storage apparatus and executing the program.

The plan generation unit 101Z has a function of generating a plan configured with a plurality of tasks from a domain based on goal information. The plan generation unit 101Z has a function of generating a plan in which a subsequent task to be employed is configured to change in accordance with a state or a condition.

The plan execution unit 102Z has a function of acquiring the plan generated by the plan generation unit 101Z and sequentially executing the tasks included in the plan. The plan execution unit 102Z has a function of sequentially executing the tasks included in the plan after changing a part of the acquired plan.

The task decomposition unit 103Z has a function of decomposing the task into a plurality of more specific tasks.

The simulator 110Z will be described later.

Figure 16:
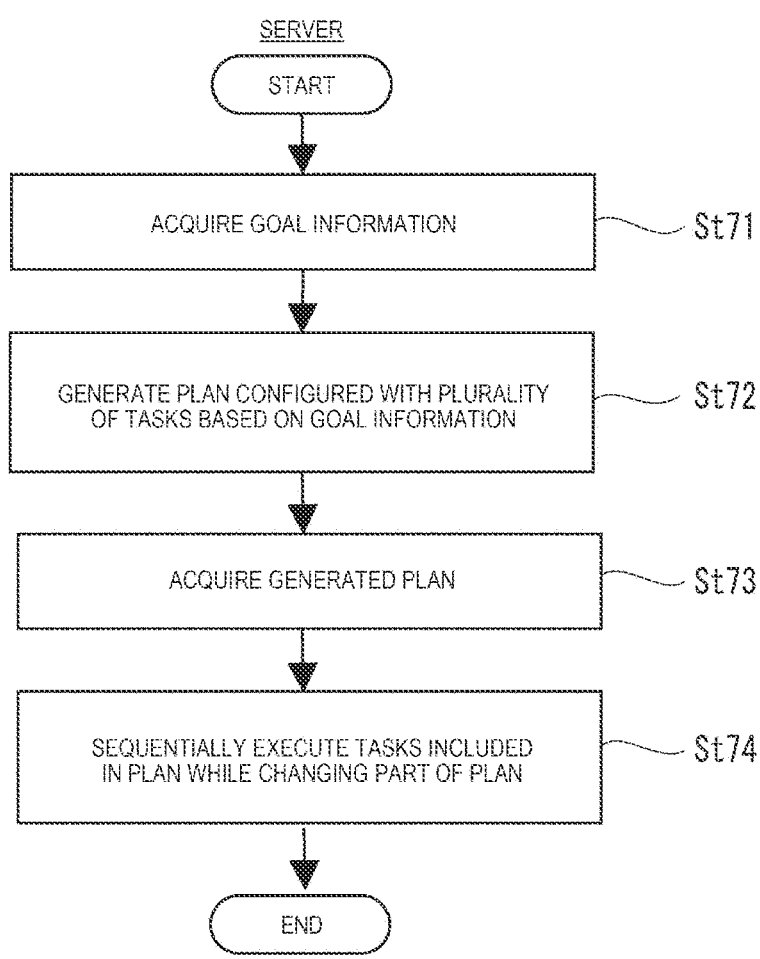
FIG. 16 is a flowchart illustrating a process example of the plan processing program according to at least one embodiment of the present invention.

Next, a program execution process in the seventh embodiment of the present invention will be described. FIG. 16 is a flowchart illustrating a process example of the plan processing program according to at least one embodiment of the present invention.

The plan generation unit 101Z acquires the goal information (St71). The plan generation unit 101Z generates the plan configured with the plurality of tasks from the domain based on the acquired goal information (St72). Here, the plan generation unit 101Z generates the plan in which the subsequent task to be employed is configured to change in accordance with the state or the condition.

The plan execution unit 102Z acquires the plan generated by the plan generation unit 101Z (St73). The plan execution unit 102Z sequentially executes the tasks included in the plan while changing a part of the acquired plan (St74).

The plan processing program executed by the server 10Z plans a task executed by a character based on a hierarchical task network. Planning the task executed by the character based on the hierarchical task network refers to constructing a plan configured with the task executed by the character using the hierarchical task network. The character refers to a target (control target character) of which a behavior is controlled based on the constructed plan. For example, a character (non-player character) that appears in the game and cannot be operated by the user corresponds to the control target character. However, the character is not limited to a humanoid character. Various objects such as a vehicle, a machine, and a castle appearing in the game may correspond to the control target character.

The goal information means data related to an objective accomplished by the control target character. For example, the goal information may be neutralization of an enemy or survival of the character. Other goal information may be set.

Figure 17:
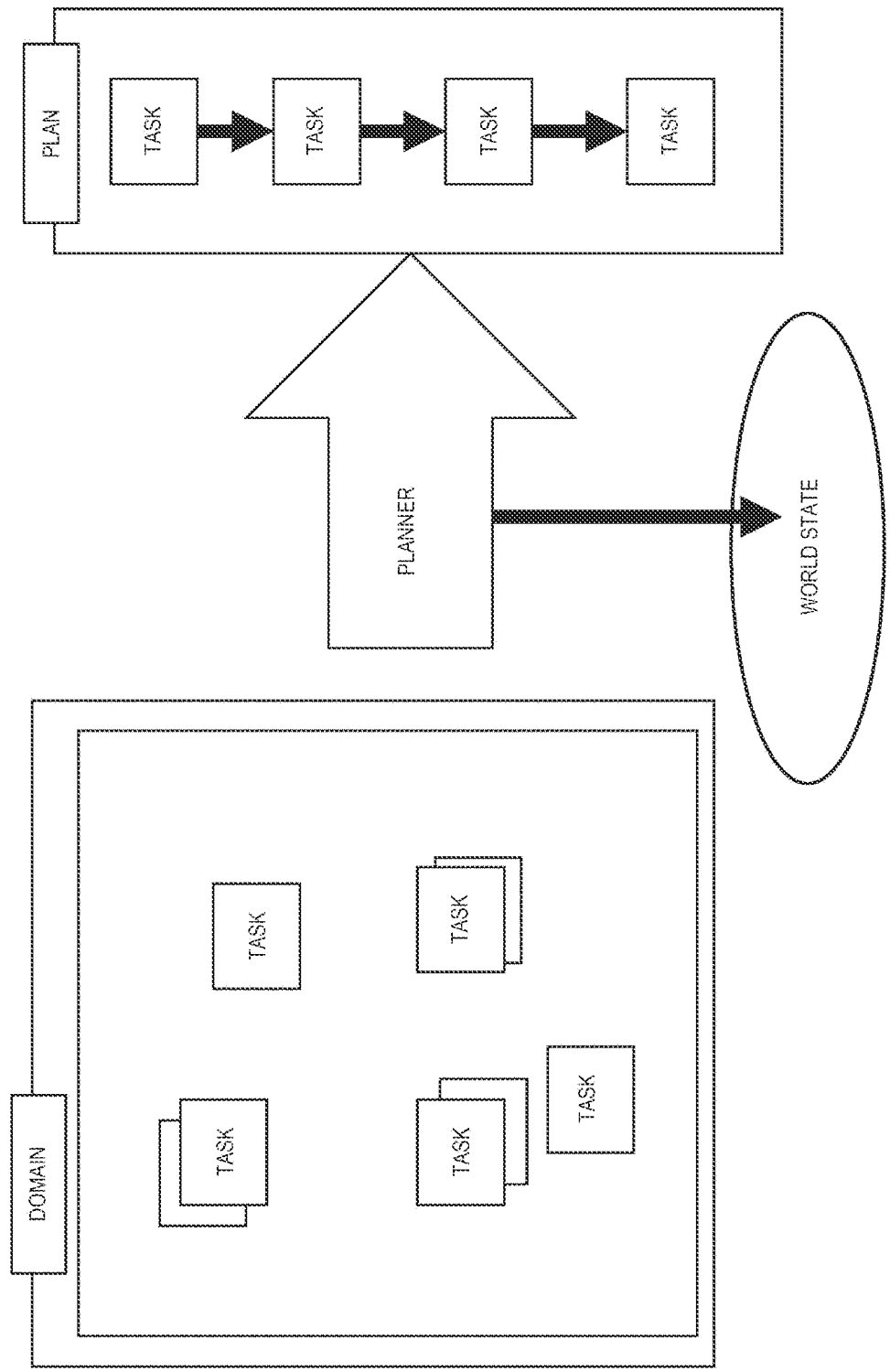
FIG. 17 is a block diagram illustrating a configuration example of a hierarchical task network according to at least one embodiment of the present invention.

FIG. 17 is a block diagram illustrating a configuration example of the hierarchical task network according to at least one embodiment of the present invention.

A task, a domain, a planner, a world state, and a plan are related to the hierarchical task network. When a space (for example, a virtual space) to which the control target character belongs is referred to as a world, a state of the world is referred to as the world state. The world state stores various information about the world.

The task means a task executed by the control target character in the hierarchical task network or the like. The task includes a primitive task and a compound task. The compound task is a kind of task that is executed in the hierarchical task network and has a plurality of methods describing a method of achieving a result to be accomplished by the task. The method has a condition for selecting the method and a list of tasks (references to the tasks) when the method is selected. The method has the condition and the list that is a reference to any of the compound task and the primitive task. The primitive task refers to a task including an operator that actually exerts an influence on an operation target. The primitive task has a condition for execution, the operator representing an executed content, and the influence (effect) on the world state at a time of execution. The operator refers to a single behavior (action) of performing the actual process.

The domain means a set of executable processes (tasks). The domain may include the compound task and the primitive task. Thus, the tasks are present in a layered state in the domain in the hierarchical task network.

The planner corresponds to the plan generation unit 101Z in the present embodiment. The planner extracts a plurality of tasks from the domain while acquiring information about the world from the world state. The plan generation unit 101Z decomposes the extracted plurality of tasks and generates a plan by deciding tasks to be executed including an execution order based on the goal information. The plan means a specific scheme generated by the planner.

By generating the plan by the planner based on the hierarchical task network, the control target character can be provided with long-term vision and perform a consistent behavior.

Figure 18:
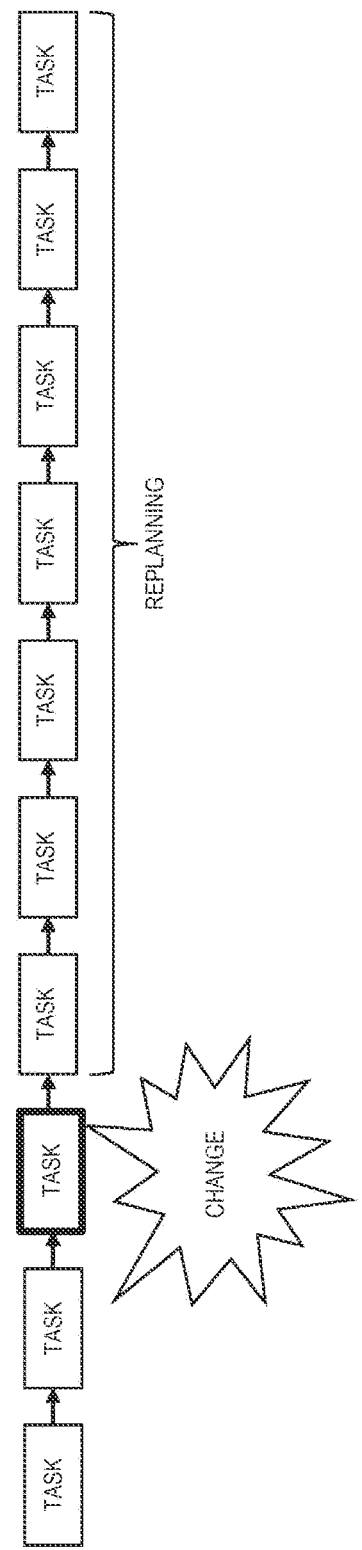
FIG. 18 is a conceptual diagram illustrating a plan generation example based on a general hierarchical task network.

FIG. 18 is a conceptual diagram illustrating a plan generation example based on a general hierarchical task network. In a case of plan generation based on a general hierarchical task network, tasks included in the generated plan are arranged in a chain of one row as illustrated.

In the game or the like in which the control target character appears, an environment may change between a time of generation of the plan and a time of execution of the plan. For example, in the middle of executing a series of tasks for performing a ranged attack on an enemy character by the control target character, in a case where the enemy character retreats outside an effective range, the control target character cannot continue executing the task of performing the ranged attack. Accordingly, in a case where the environment changes after the plan is generated, the planning based on the existing hierarchical task network does not have means for adapting the already generated plan well to the change. Thus, regeneration of the plan (replanning) occurs. In a case where this replanning is frequently performed, the control target character may lose long-term consistency.

Therefore, in the plan processing program according to at least one embodiment of the present invention, the plan generation unit 101Z generates the plan in which the subsequent task to be employed is configured to change in accordance with the state or the condition.

The state means a status of a changing thing at any time. For example, a fact that a buff is applied to the control target character is an example of the state. The state may mean the state of a target other than the control target character. For example, a fact that a debuff is applied to an enemy character, or a fact that weather in a field in which the control target character is present is rainy is an example of the state.

The condition refers to a matter as an assumption or a constraint when the event is decided or promised. More specifically, the condition refers to a matter as an assumption or a constraint when the task is decided. For example, "enemy is not present", "enemy is running away", "health value of control target character is greater than or equal to 100", or "weapon having attack value of 200 or more is possessed" is an example of the condition.

Figure 19:
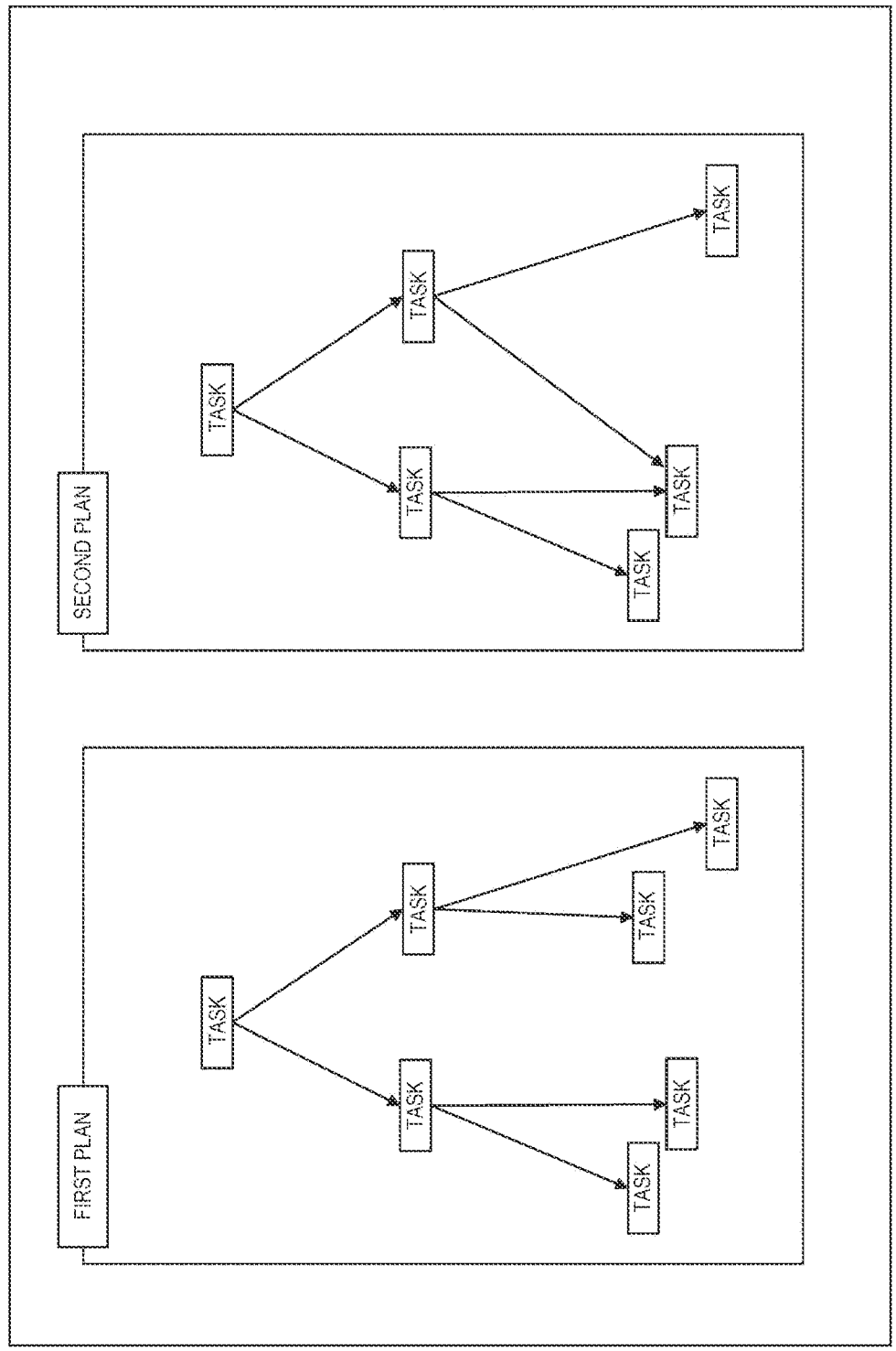
FIG. 19 is a conceptual diagram illustrating a plan generated by a planner according to at least one embodiment of the present invention.

FIG. 19 is a conceptual diagram illustrating the plan generated by the planner according to at least one embodiment of the present invention. The plan generation unit 101Z generates the plan in which the subsequent task to be employed is configured to change in accordance with the state or the condition. In FIG. 19, a first plan and a second plan are illustrated as an example of the plan in which the subsequent task to be employed is configured to change in accordance with the state or the condition. The first plan is a plan configured as a tree structure in which an offshoot branches in accordance with the state or the condition. The second plan is a plan configured as a directed acyclic graph.

By causing the plan generation unit 101Z to generate the plan in which the subsequent task to be employed is configured to change in accordance with the state or the condition, the behavior of the control target character can flexibly handle an environmental change. Particularly, since the number of times of replanning corresponding to the environmental change is decreased, the control target character can be flexibly controlled even in a game or the like that requires real-timeness. In addition, the control target character can flexibly handle a detailed animation control, an accidental event that probabilistically occurs, and an environment in which an agent (for example, the enemy character) having a different intention from the control target character is present.

Figure 20:
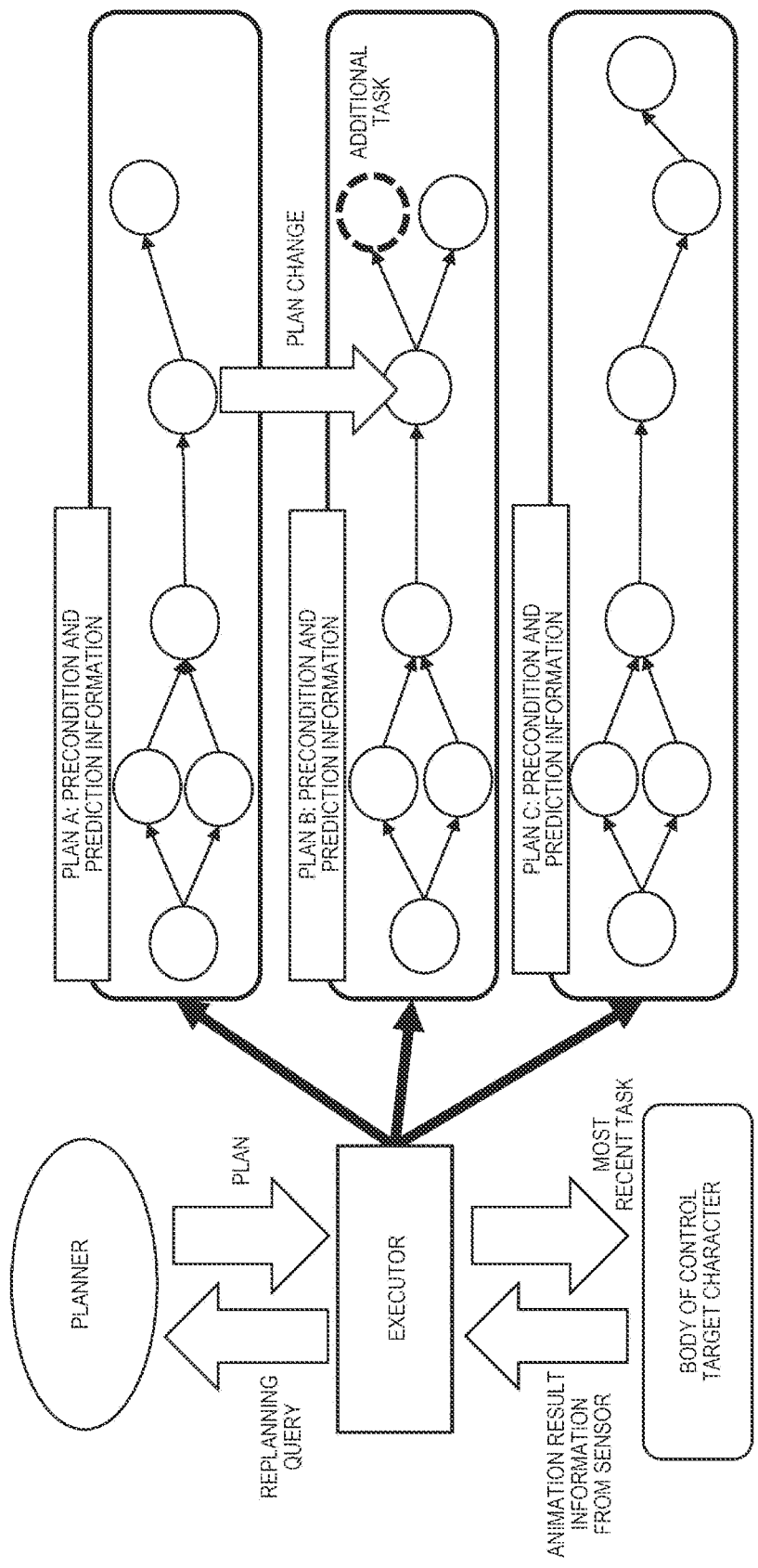
FIG. 20 is a conceptual diagram illustrating a structure example of the hierarchical task network in the plan processing program according to at least one embodiment of the present invention.

FIG. 20 is a conceptual diagram illustrating a structure example of the hierarchical task network in the plan processing program according to at least one embodiment of the present invention.

The plan processing program according to at least one embodiment of the present invention includes an executor (plan execution unit 102Z) in addition to the planner (plan generation unit 101Z).

The executor acquires one or more plans generated by the planner and sequentially executes tasks included in the acquired plan. In a case where the executor executes the most recent task, a figure (body) of the control target character is controlled in accordance with the execution of the most recent task. For example, the body of the control target character performs an action in the game.

Here, in the plan processing program according to at least one embodiment of the present invention, roles may be distributed by separating the planner that is a module making the plan, and the executor that is a module executing the plan. The executor that is responsible for plan execution is provided with a permission to be able to partially change or suspend the plan. The executor has a function and a permission to not only simply execute the plan acquired from the planner but also change a part of the acquired plan. The executor may further have a function of managing a plurality of plans and a function of evaluating the tasks.

Here, three plans of a plan A, a plan B, and a plan C acquired from the planner by the executor are illustrated in FIG. 20. Each of the plan A to the plan C may include information indicating a precondition as a reference for executing the plan. Each of the plan A to the plan C may include prediction information for the plan. The prediction information includes the evaluation value or the like of the task calculated using the simulator described later.

The executor changes a part of the acquired plan based on feedback information or the like from the body of the control target character. For example, the feedback information from the body of the control target character may be information indicating an animation result for the body of the control target character or information (for example, visual information or auditory information of the character) acquired by various sensors linked to the body of the control target character. That is, the executor executes the plan while dynamically changing a part of the plans based on information sensed by the control target character.

For example, changing a part of the acquired plan includes modifying, replacing, or deleting a part of the tasks included in the acquired plan. Changing a part of the acquired plan may include adding a new task to the plan. Changing a part of the acquired plan may include suspending execution of a task included in the acquired plan. For example, changing a part of the acquired plan may include changing an execution target plan to a different plan during execution of a certain plan. In FIG. 20, as an example, an example in which the executor changes the execution target plan to the plan B during execution of the plan A and adds corresponding tasks to the plan B in accordance with tasks included in the plan A is illustrated.

In a case where the executor determines that any of the possessed plans cannot be executed based on the feedback information from the body of the control target character, the executor may transmit a replanning query to the planner. The planner that receives the replanning query performs replanning and transmits a regenerated plan to the executor.

As described above, by causing the executor to sequentially execute the tasks included in the plan while changing a part of the plan, a situation in which a behavior control of the control target character is not performed as in the plan can be robustly handled. For example, the executor can cause the control target character to perform a sudden behavior by executing the plan while changing a part of the plan in accordance with an environmental change caused by a behavior of the enemy character.

Decomposition at Time of Execution of Task

Figure 21:
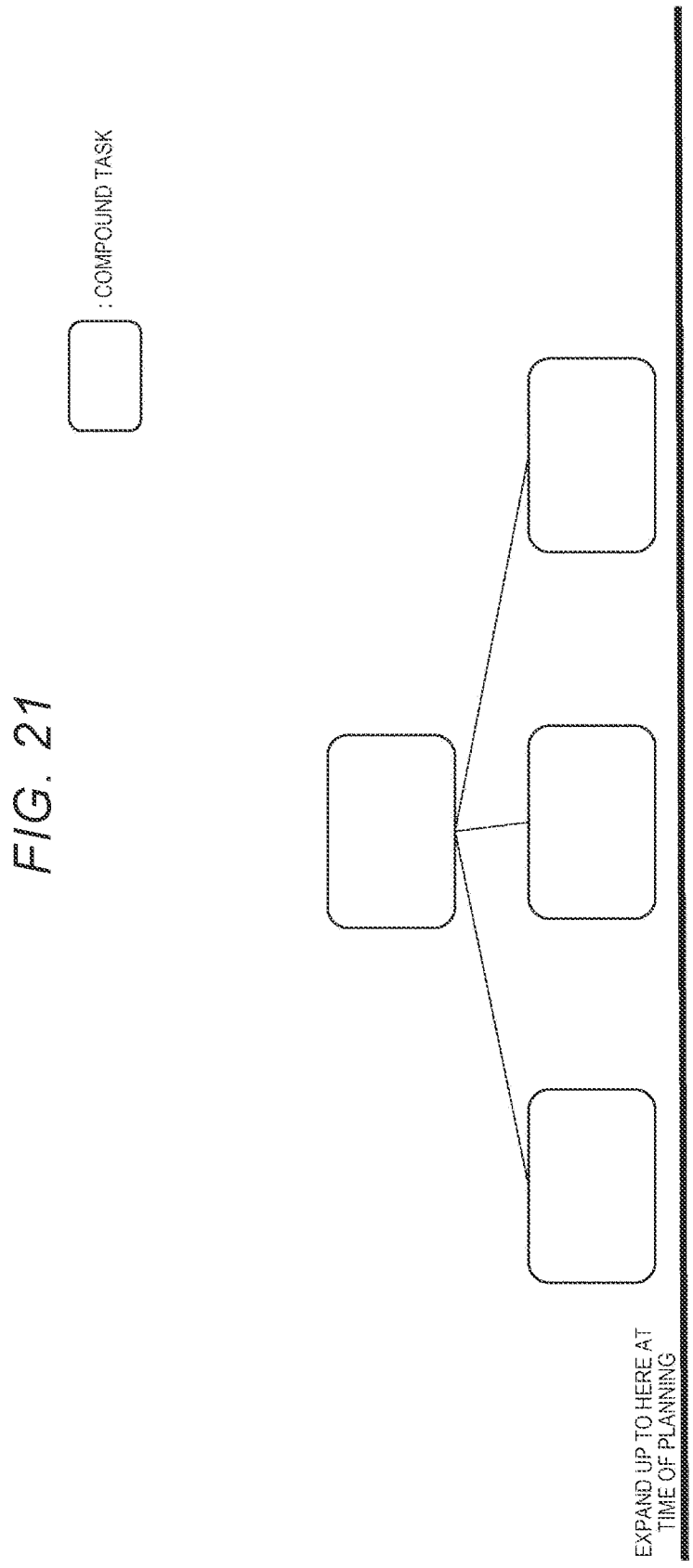
FIG. 21 is a conceptual diagram illustrating a decomposition example of a task in the plan processing program according to at least one embodiment of the present invention.
Figure 22:
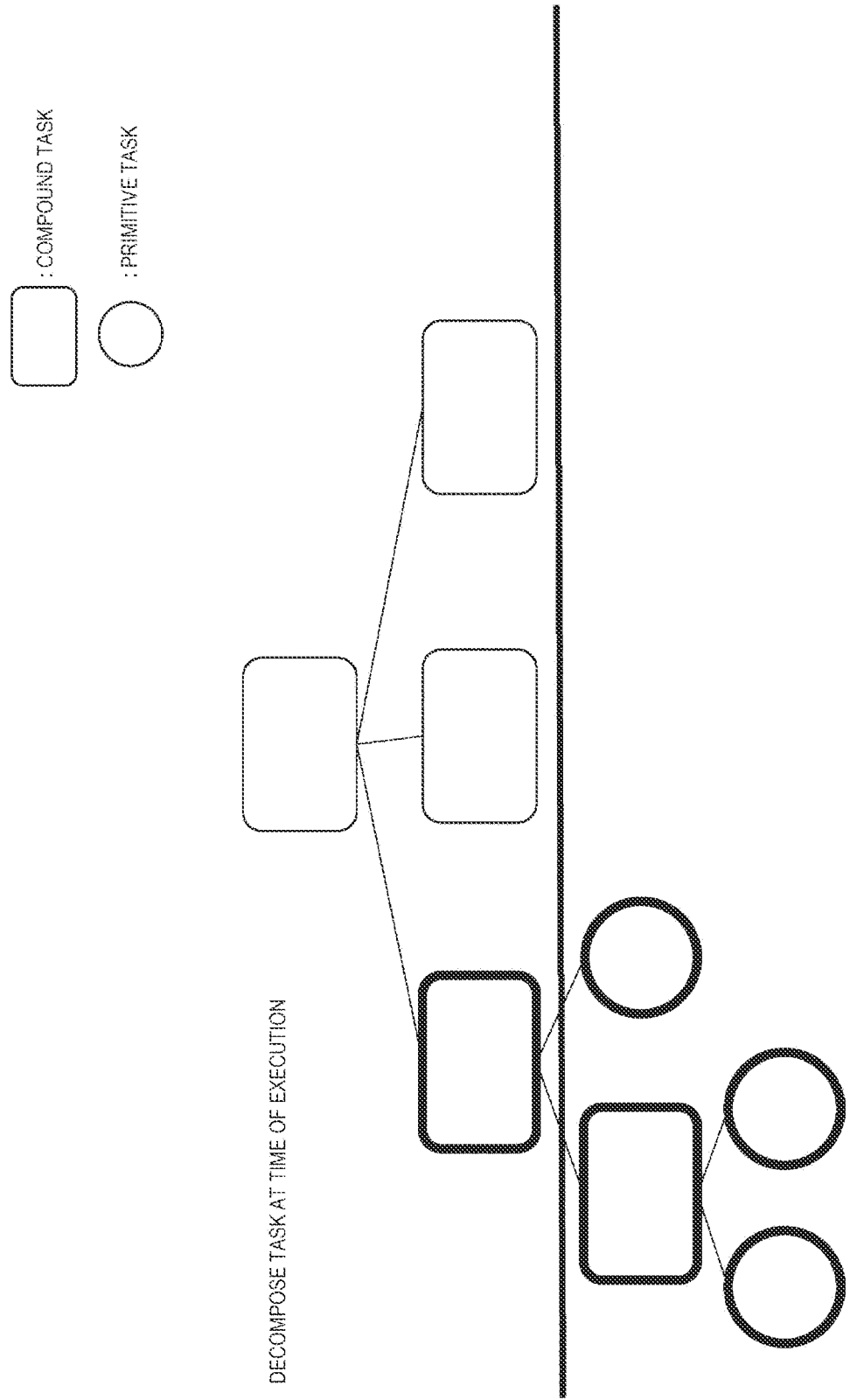
FIG. 22 is a conceptual diagram illustrating a decomposition example of the task in the plan processing program according to at least one embodiment of the present invention.
Figure 23:
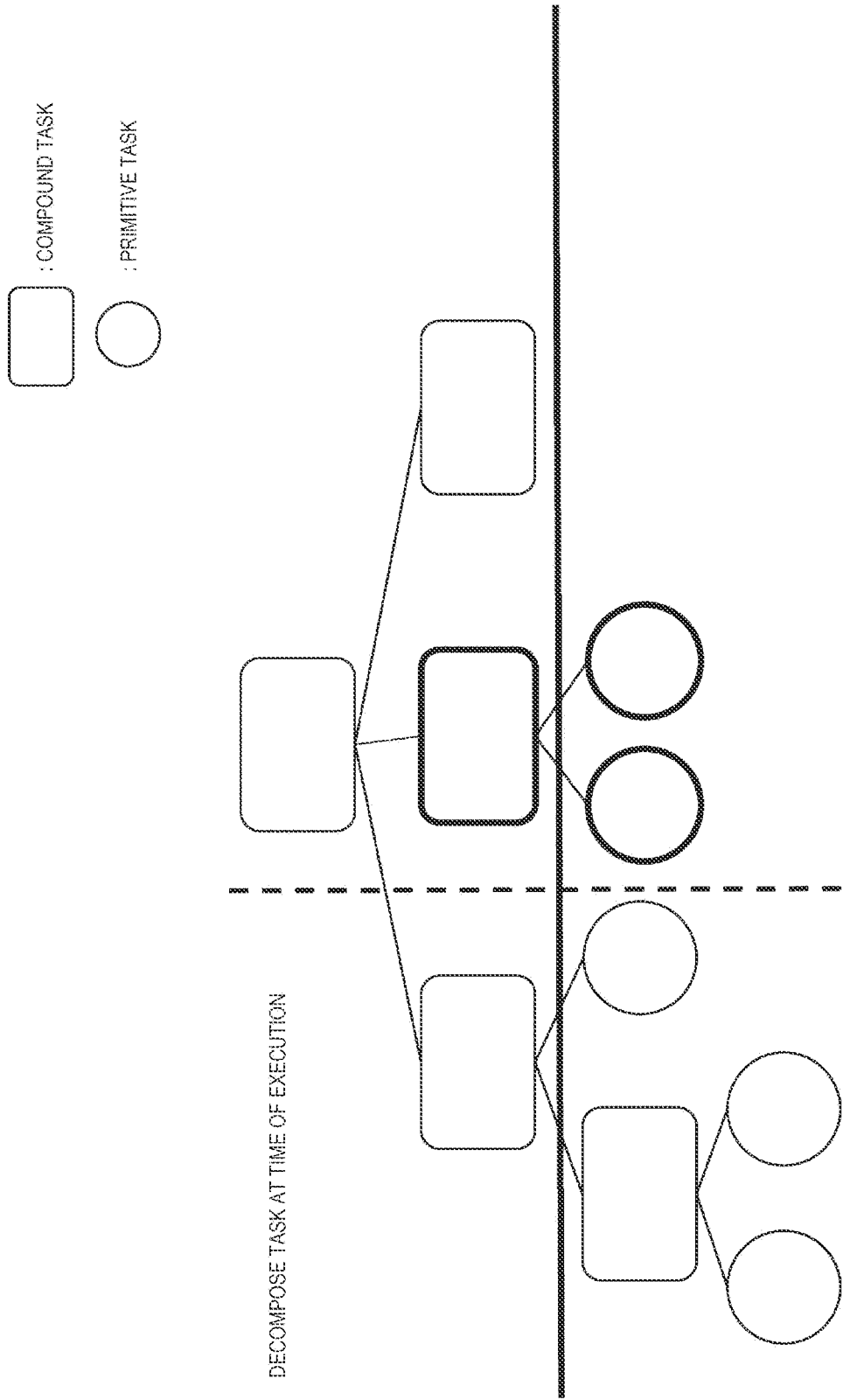
FIG. 23 is a conceptual diagram illustrating a decomposition example of the task in the plan processing program according to at least one embodiment of the present invention.
Figure 24:
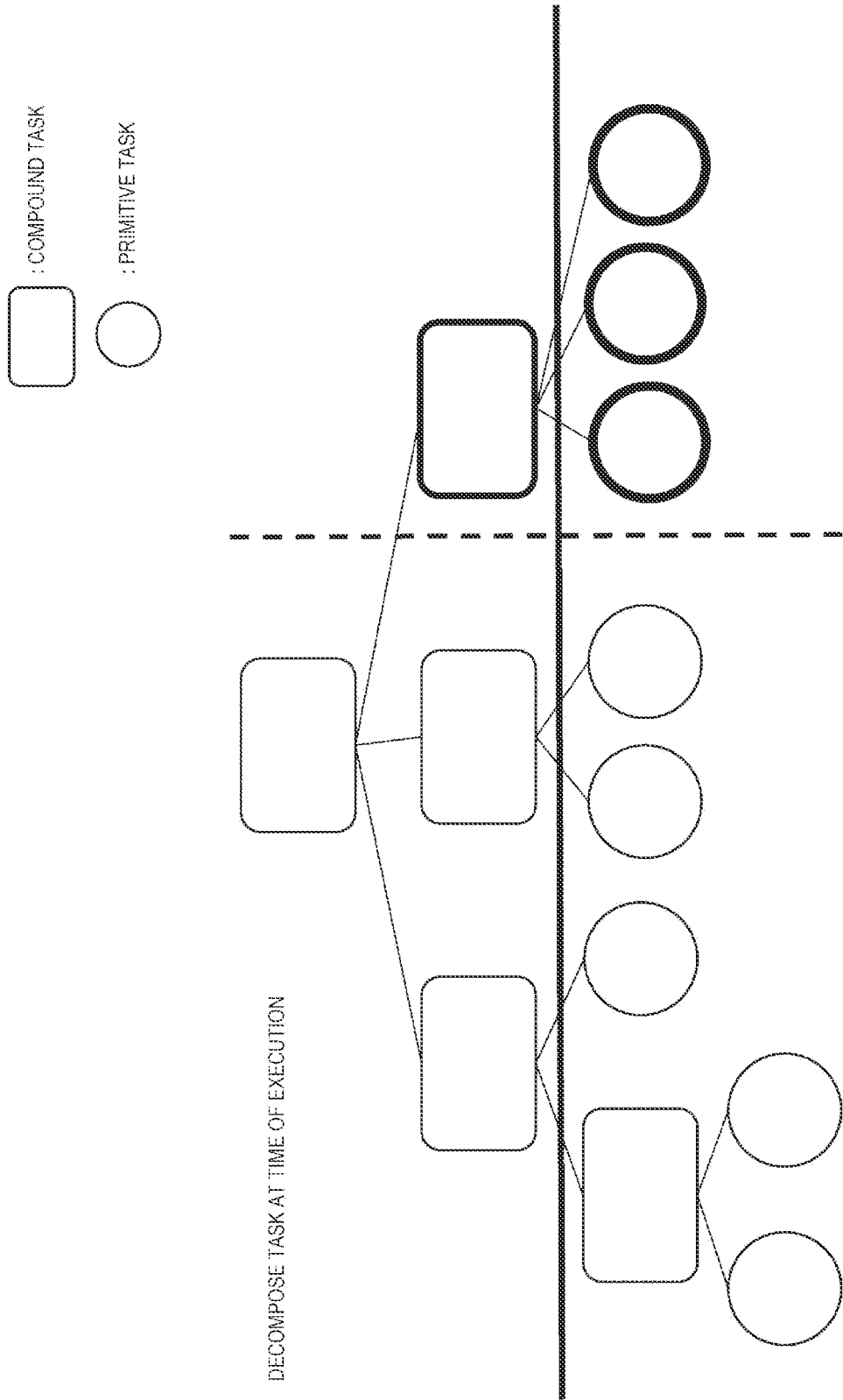
FIG. 24 is a conceptual diagram illustrating a decomposition example of the task in the plan processing program according to at least one embodiment of the present invention.

FIG. 21 is a conceptual diagram illustrating a decomposition example of the task in the plan processing program according to at least one embodiment of the present invention. FIG. 22 is a conceptual diagram illustrating a decomposition example of the task in the plan processing program according to at least one embodiment of the present invention. FIG. 23 is a conceptual diagram illustrating a decomposition example of the task in the plan processing program according to at least one embodiment of the present invention. FIG. 24 is a conceptual diagram illustrating a decomposition example of the task in the plan processing program according to at least one embodiment of the present invention. Hereinafter, decomposition at a time of execution of the task will be described based on FIG. 21 to FIG. 24.

As described based on FIG. 17, the domain of the hierarchical task network includes the compound task and the primitive task. In implementation of the hierarchical task network in the related art, the planner decomposes the compound task up to the primitive task at the time of generation of the plan. However, in a case where replanning occurs in accordance with an environmental change, most part of a task decomposition process results in an unnecessary process.

Therefore, in the plan processing program according to at least one embodiment of the present invention, the plan generation unit 101Z generates the plan after causing the task decomposition unit 103Z to perform task decomposition up to a predetermined layer. The plan execution unit 102Z sequentially executes the tasks included in the plan after performing the task decomposition on at least a part of the tasks included in the plan up to a layer deeper than the predetermined layer.

FIG. 21 illustrates the task decomposition by the plan generation unit 101Z at the time of plan generation. At the time of plan generation, the plan generation unit 101Z performs the task decomposition up to the predetermined layer.

FIG. 22 to FIG. 24 illustrate the task decomposition by the plan execution unit 102Z at the time of execution of the plan. At the time of execution of the plan, the plan execution unit 102Z sequentially executes the tasks included in the plan after performing the task decomposition up to a layer deeper than the predetermined layer. For example, the layer deeper than the predetermined layer may be a layer in which the primitive task is present.

For example, the predetermined layer may be decided in advance like a second layer. The predetermined layer may be uniformly decided for any task. The predetermined layer may be decided in accordance with the tasks such as up to the second layer for a task A before decomposition and up to a third layer for the task B before decomposition. The predetermined layer may be dynamically decided by the processor executing the plan processing program based on various conditions such as a required execution speed of the tasks and a rate of the environmental change in the game.

For example, in a real-time game having a fast environmental change, the environment may significantly change between the time of generation of the plan and the time of execution of the plan. In addition, the environment changes in accordance with a behavior or a situation change of an object other than the control target character, such as the enemy character. As described above, by stopping the task decomposition in a certain layer at the time of plan generation and performing the subsequent task decomposition at the time of plan execution, the control target character can efficiently execute tasks complying with the environment at the time of execution of the plan while complying with an approximate plan.

Plan Generation Using Simulator As described above based on FIG. 17, the planner extracts a plurality of tasks from the domain while acquiring information about the world from the world state. The plan generation unit 101Z decomposes the extracted plurality of tasks and generates a plan by deciding tasks to be executed including the execution order based on the goal information.

Here, the plan generation unit 101Z in the plan processing program according to at least one embodiment of the present invention may perform the plan generation by further using the simulator 110Z.

The plan generation unit 101Z has a function of calculating an evaluation value by tentatively executing a plurality of selectable tasks included in the domain by the simulator and generating the plan based on the goal information and the evaluation value.

In step St72, the plan generation unit 101Z calculates the evaluation value by tentatively executing the plurality of selectable tasks included in the domain by the simulator and generates the plan based on the goal information and the evaluation value.

The simulator refers to a program, an apparatus, a system, or a combination thereof that tentatively executes the task. The simulator may be the simulator 110Z described above based on FIG. 15.

The evaluation value may be a value decided for the task or may be a value decided for a group configured with a series of tasks.

Figure 25:
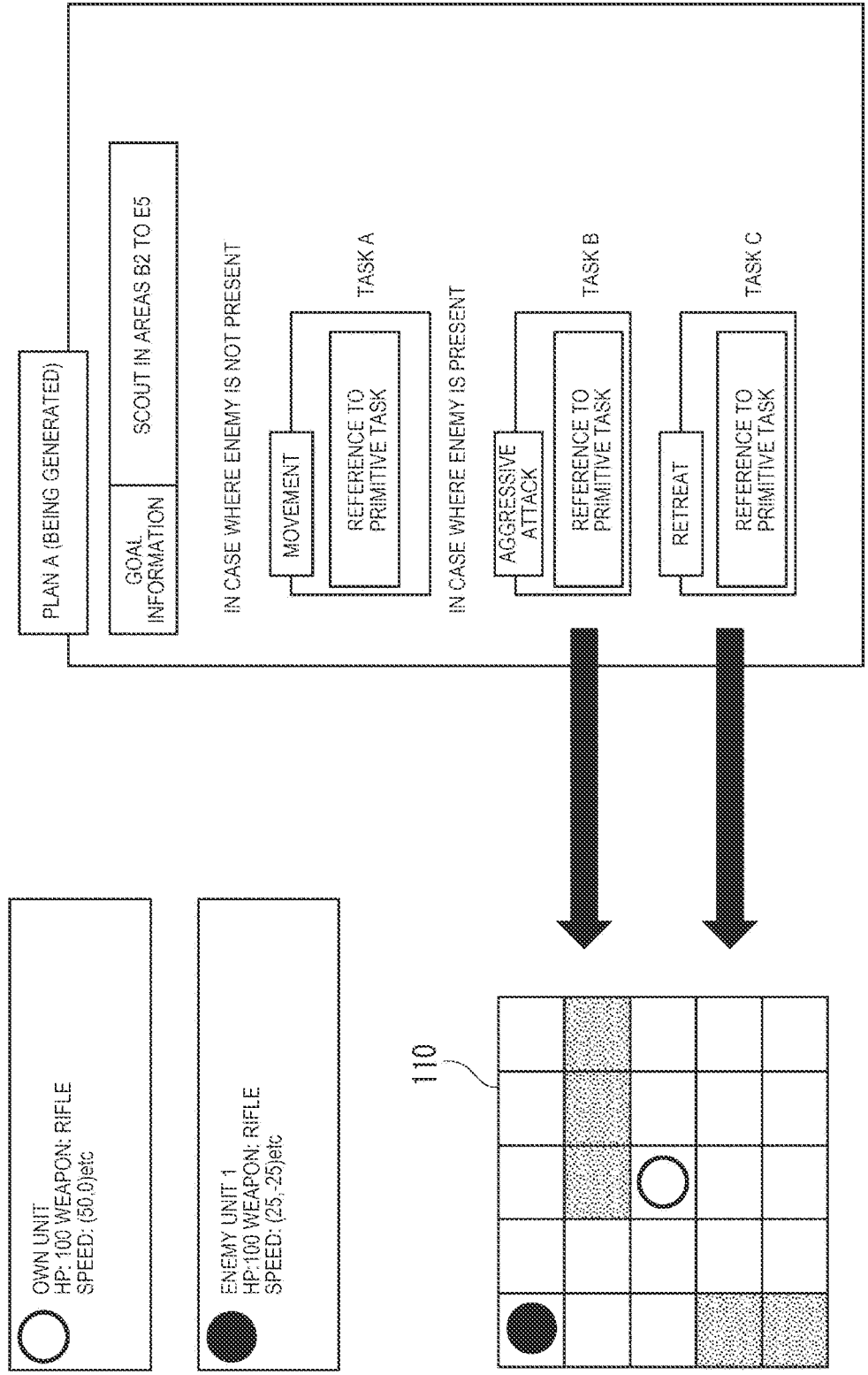
FIG. 25 is a conceptual diagram illustrating plan generation using a simulator in the plan processing program according to at least one embodiment of the present invention.

FIG. 25 is a conceptual diagram illustrating the plan generation using the simulator 110 in the plan processing program according to at least one embodiment of the present invention.

As an example, it is assumed that the plan generation unit 101Z is in the middle of generating the plan A for controlling the control target character. It is assumed that the goal information of the plan A is "complete scouting in areas B2 to E5 that are a scouting target area".

The plan generation unit 101Z acquires three tasks from the domain as candidates of a task to be included in the plan for controlling the control target character. The task A is a compound task of performing movement. The task B is a compound task of performing an aggressive attack on the enemy character. A task C is a compound task of retreating from the scouting target area. Each of the tasks A to C includes a reference to a primitive task.

The plan generation unit 101Z generates the plan in which the subsequent task to be employed changes in accordance with a condition of whether or not an enemy is present. The task A is set as a task to be employed in a case where enemy is not present. Two candidates of the task B and the task C are present as a task to be employed in a case where the enemy is present. For example, in a case where a possibility of losing to the enemy is low, the control target character may execute the task B. In a case where the possibility of losing to the enemy is high, the control target character may execute the task C. Here, the environment in the game is not constant, and strength, the number of persons, a position, and a state (negligence or the like) of the enemy are also not constant.

Therefore, the plan generation unit 101Z calculates the evaluation value by tentatively executing the plurality of selectable tasks included in the domain by the simulator 110. Information acquired from the world state is input into the simulator 110. A calculation expression or a calculation algorithm of the evaluation value may be determined in accordance with the task or the group of tasks. For example, a probability of losing to the enemy may be used as the evaluation value. The plan generation unit 101Z generates the plan based on the goal information and the evaluation value. For example, in a case where a simulation result indicating that the possibility of losing to the enemy is low is obtained, the plan generation unit 101Z sets the task B as a task to be employed in a case where the enemy is present. In a case where a simulation result indicating that the possibility of losing to the enemy is high is obtained, the plan generation unit 101Z sets the task C as a task to be employed in a case where the enemy is present.

As described above, since the plan generation is performed based on logical inference, generating the plan by the plan generation unit 101Z based on the evaluation value obtained by performing simulation enables planning to be performed after an environmental or situation change accompanied by the task execution is predicted.

The world state may include location information. The plan generation unit 101Z may generate the plan based on the evaluation value obtained by performing simulation based on the location information. Accordingly, for example, a plan based on a strategy using geographical features between the control target character and the enemy character or a tactic using a positional relationship between the enemy and an ally can be flexibly generated.

Low Resolution Simulator

Resolution (granularity) of a world used by the simulator 110 may be lower (coarse) resolution (granularity) than a world in which the plan generated by the plan generation unit 101Z is executed. That is, the following applies. It is assumed that the plan generated by the plan generation unit 101Z causes the control target character to execute a task included in the plan using first spatial information corresponding to a space in which the task may be executed. Meanwhile, it is assumed that the simulator 110 tentatively executes a selectable task using second spatial information corresponding to the space in which the control target character may execute a task included in the plan. At this point, the second spatial information has a smaller information amount than the first spatial information.

The spatial information may be information representing or describing at least a part of the space. In an example of a game space in which the control target character appears, a waypoint graph or the like converted from a navigation mesh corresponds to the spatial information. Map information or the like in which a two-dimensional space is represented by dividing the two-dimensional space into a plurality of squares or hexes also corresponds to the spatial information. Voxel information or the like in which a three-dimensional space is represented by dividing the three-dimensional space into a plurality of parts also corresponds to the spatial information. Other spatial information may also be used.

Figure 26:
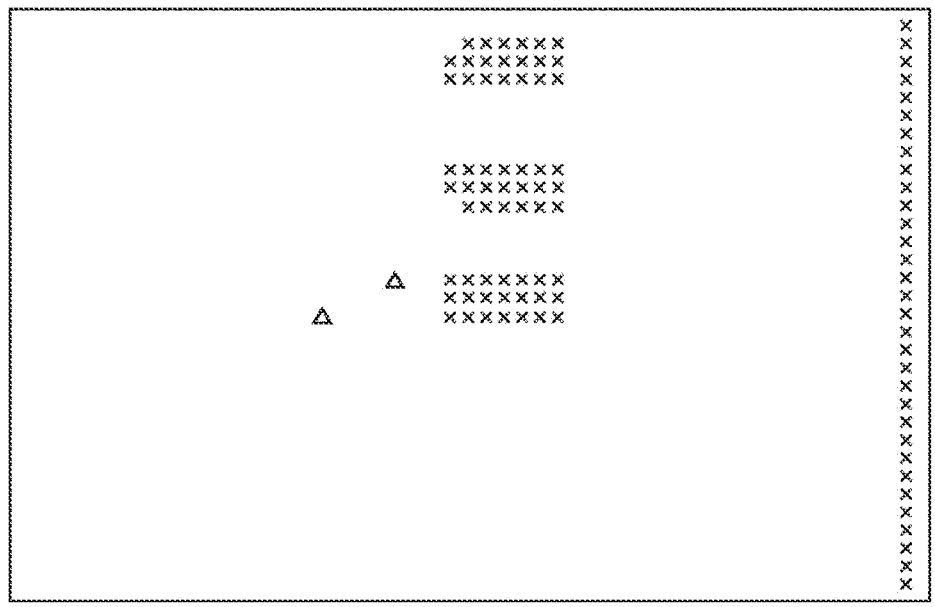
FIG. 26 is a conceptual diagram illustrating a case where a game space is represented based on second spatial information having a small information amount in the simulator used by the plan processing program according to at least one embodiment of the present invention.

FIG. 26 is a conceptual diagram illustrating a case where the game space is represented based on the second spatial information having a small information amount in the simulator 110 used by the plan processing program according to at least one embodiment of the present invention. The second spatial information illustrated in FIG. 26 can represent the game space of the game actually played by the user by simplifying (decreasing the resolution) the game space. A location such as a mountain or a wall to which the character cannot move is represented by x, and the character is represented by A.

Since the second spatial information has a smaller information amount than the first spatial information, the tentative execution of the task by the simulator 110 can be performed at a high speed, and the plan generation unit 101Z can quickly generate the plan.

Adversarial Planning Next, planning in a case where the object other than the control target character exerts an influence on the environmental change will be described.

The plan generation unit 101Z has a function of generating the plan from the domain based on the goal information and task execution, an action, or a state change of the object other than the character.

In step St72, the plan generation unit 101Z generates the plan configured with the plurality of tasks from the domain based on the acquired goal information and the task execution, the action, or the state change of the object other than the character.

The character in "object other than the character" means a character controlled based on the plan generated by the plan generation unit 101Z. The character will be referred to as the control target character for convenience.

The object other than the character means an object different from the control target character. The object includes a character different from the control target character. For example, in a game including a fighting element, a character (enemy character) that is an adversary to the control target character is included in the object other than the character. A character (allied character) that cooperates with the control target character is also included in the object other than the character. In addition, any object other than the character, for example, an automobile object or a building object appearing in the game, is included in the object other than the character. The object other than the character may be a game world (game object) to which the control target character belongs. The object other than the character may be an object that can execute the task. The object other than the character may be an object that can execute the action. For example, the enemy character can execute the task and can also execute the action.

The task execution, the action, or the state change of the object other than the control target character may or may not correspond to the task execution by the control target character.

Figure 27:
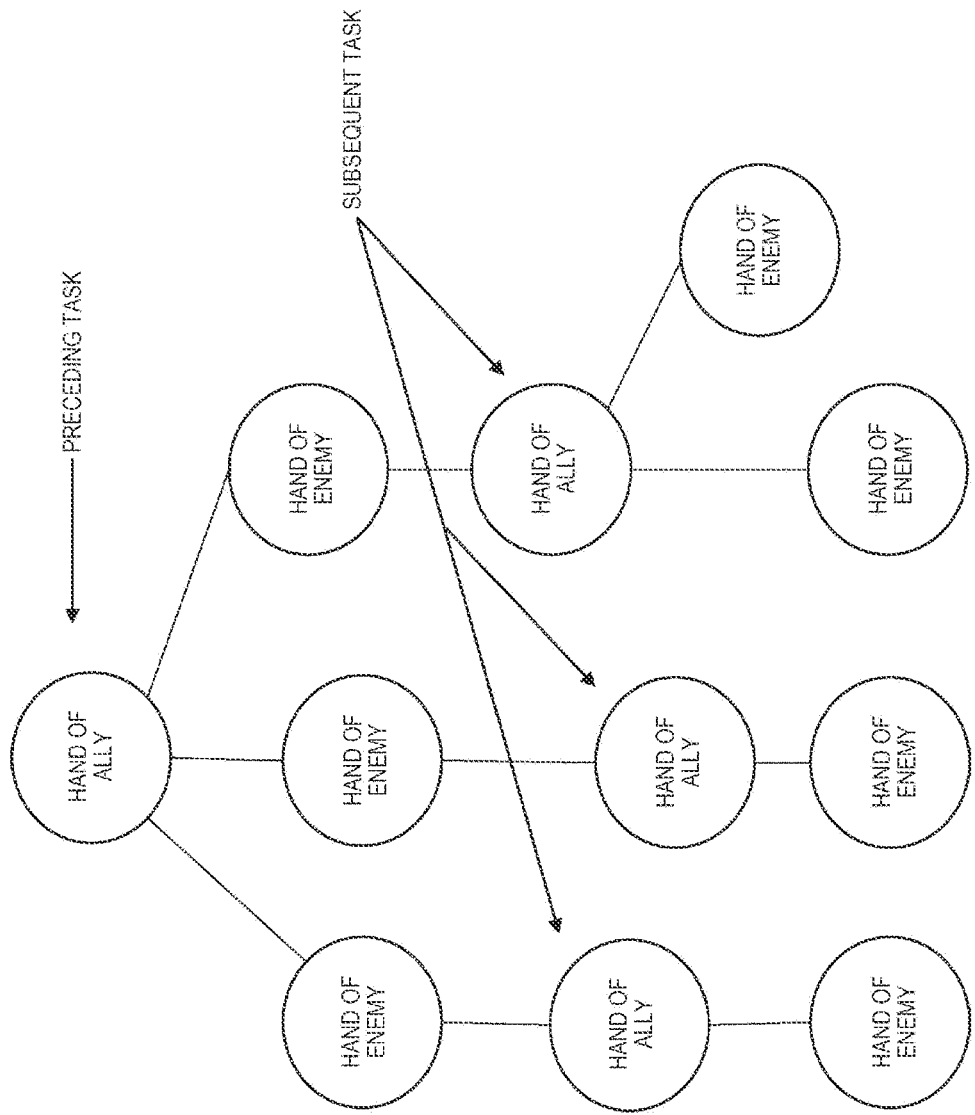
FIG. 27 is a conceptual diagram illustrating a plan generation example in which task execution, an action, or a state change of an object other than a control target character is considered according to at least one embodiment of the present invention.

FIG. 27 is a conceptual diagram illustrating a plan generation example in which the task execution, the action, or the state change of the object other than the control target character is considered according to at least one embodiment of the present invention.

A case where the object other than the control target character is the enemy character will be illustratively described. The plan illustrated in FIG. 27 illustrates plan generation in a fighting game (turn-based battle game) of a type in which an enemy and an ally alternately execute tasks. A node described as a hand of the ally corresponds to a task executed by the control target character. A node described as a hand of the enemy corresponds to a task executed by the enemy character.

It is assumed that the control target character executes a preceding task. Next, the environment changes by the task executed by the enemy character. The plan generation unit 101Z generates a plan such that a task corresponding to the environmental change is included in the plan. That is, the plan generation unit 101Z generates a plan in which a behavior or the like of the object other than the control target character is considered.

The present invention is not limited to alternate execution between task execution by the control target character and task execution by the object other than the control target character. For example, the enemy character or an allied character may consecutively execute tasks twice. In a case of a non-turn-based fighting game, each of the enemy character and the allied character may execute a task thereof without waiting for task execution of an opponent.

In addition, the object other than the control target character is not limited to the enemy character. In a case where an object other than the control target character that changes the environment is present, the plan generation unit 101Z can generate a plan by considering the environmental change caused by the object.

With the above configuration, planning that can flexibly handle the environmental change based on the object (for example, the enemy character) other than the character can be performed.

Figure 28:
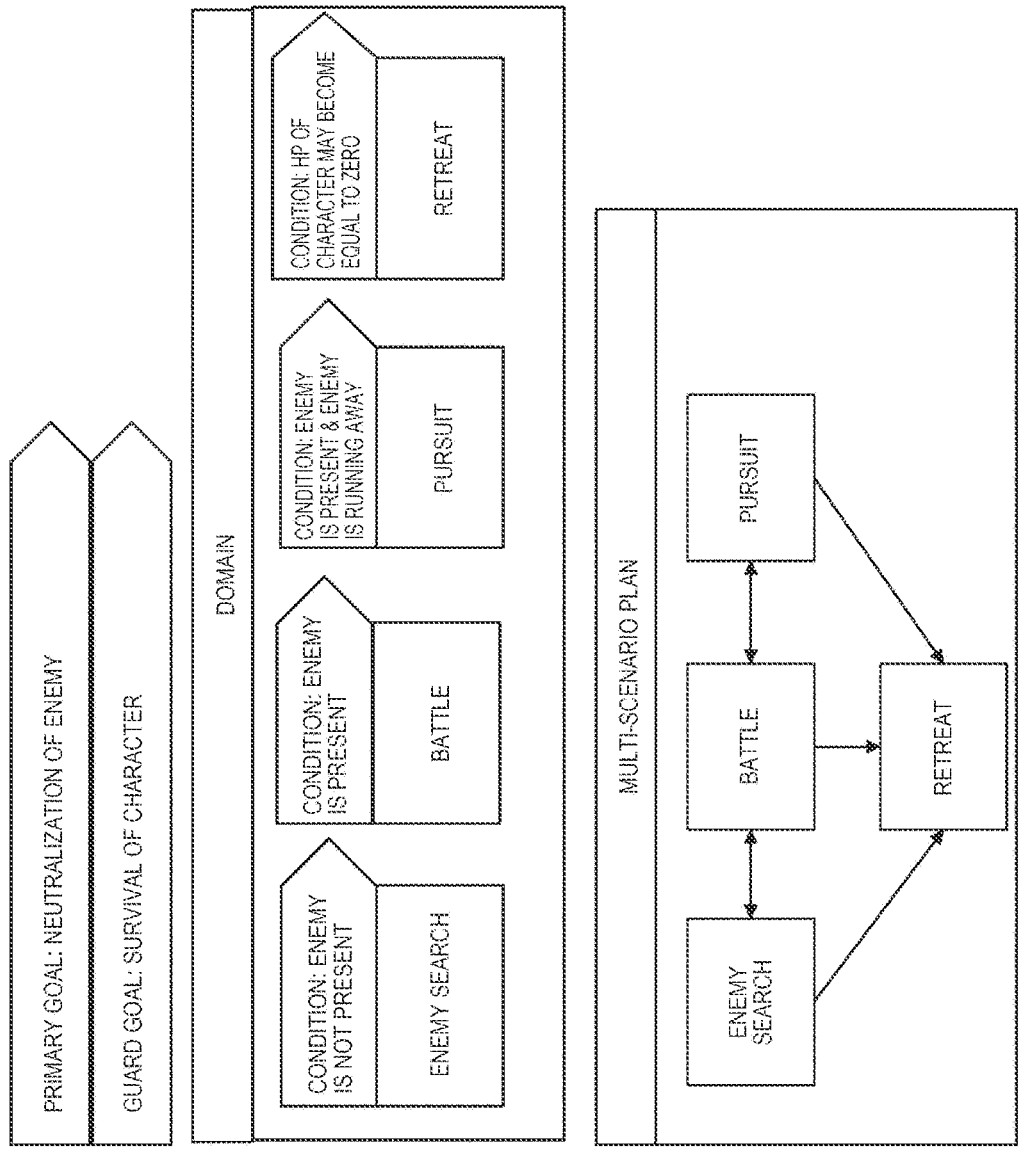
FIG. 28 is a conceptual diagram illustrating an example of a multi-scenario plan generated by a plan generation unit according to at least one embodiment of the present invention.

Multi-Scenario Plan FIG. 28 is a conceptual diagram illustrating an example of a multi-scenario plan generated by the plan generation unit 101Z according to at least one embodiment of the present invention.

It is assumed that "primary goal: neutralization of enemy" and "guard goal: survival of character" are provided as the goal information. The domain includes the following four compound tasks.

Enemy search task (task execution condition: enemy is not present)
Battle task (task execution condition: enemy is present)
Pursuit task (task execution condition: enemy is present, and enemy is running away)
Retreat task (task execution condition: health value (HP) of character may become equal to zero)

For example, the multi-scenario plan based on the domain is represented by a directed graph as illustrated in FIG. 28. A bidirectional transition can be made between the battle task and the enemy search task. A bidirectional transition can be made between the battle task and the pursuit task. While a transition can be made from the enemy search task to the retreat task, a transition cannot be made from the retreat task to the enemy search task. While a transition can be made from the battle task to the retreat task, a transition cannot be made from the retreat task to the battle task. While a transition can be made from the pursuit task to the retreat task, a transition cannot be made from the retreat task to the pursuit task.

Figure 29:
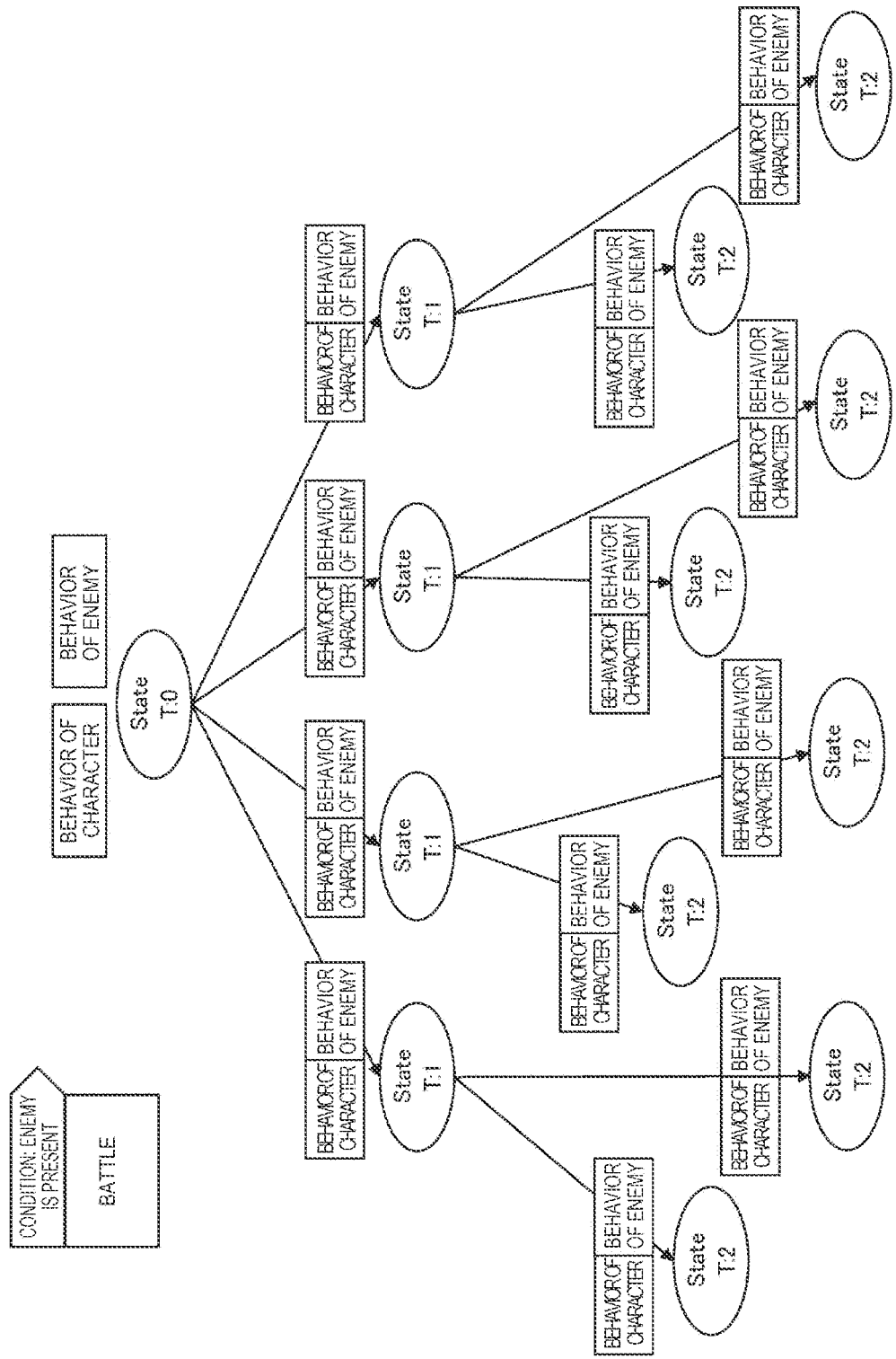
FIG. 29 is a conceptual diagram illustrating an expansion example of the task by the plan generation unit according to at least one embodiment of the present invention.

The plan generation unit 101Z expands each task included in the multi-scenario plan into, for example, a tree structure. FIG. 29 is a conceptual diagram illustrating an expansion example of the task by the plan generation unit 101Z according to at least one embodiment of the present invention.

The plan generation unit 101Z expands the battle task illustrated in FIG. 28 into a tree structure. Since the battle task is a task of a battle with the enemy, the environment keeps changing in accordance with a behavior (task) executed by each of the character that is the control target character and the enemy that is the enemy character.

First, the plan generation unit 101Z expands the tree from time step T:0 to time step T:1. That is, the plan generation unit 101Z enumerates a behavior (task) performable by the control target character and a behavior (task) performable by the enemy character in time step T:0 and creates a branching offshoot in the tree in accordance with a pattern of each behavior.

In a case where the control target character continues the previous behavior in time step T:1, the plan generation unit 101Z causes the control target character to continue the same behavior. Meanwhile, in a case where the control target character finishes the previous behavior in time step T:1, the plan generation unit 101Z selects the next behavior (task) to be executed by the control target character. This process of selecting the next behavior (task) may be the same process as in the expansion of the tree from time step T:0 to time step T:1.

In a case where the enemy character continues the previous behavior in time step T:1, the plan generation unit 101Z further advances the expansion of the task for the control target character on an assumption that the enemy character continues the same behavior. Meanwhile, in a case where the enemy character finishes the previous behavior in time step T:1, the plan generation unit 101Z selects the next behavior (task) to be executed by the enemy character. This selection of the next behavior (task) may be the same process as in the expansion of the tree from time step T:0 to time step T:1.

The plan generation unit 101Z sequentially repeats the above process from time step T:0. The number of states (a value of N in time step T:N) to which the process is repeated may be different or the same for each branching offshoot.

Priority of Offshoot

As described above, in a case of expanding the task in accordance with the behavior of each of the control target character and the enemy character, the number of states may be enormously increased. In order to suppress an increase in the number of states at a time of task expansion, providing the offshoot with a priority is considered. For example, the plan generation unit 101Z may decide the priority of the offshoot connecting from a preceding task to a subsequent task in accordance with the evaluation value of the subsequent task and generate a plan based on the priority of the offshoot.

For example, the plan generation unit 101Z decreases the priority of the offshoot for which the evaluation value of a state (subsequent state) ahead of the offshoot is less than a predetermined value. Hereinafter, a specific example will be illustrated. The predetermined value is set to 500. The plan generation unit 101Z decreases the priority of the offshoot for which the evaluation value in time step T:0 is 1000, and the evaluation value in time step T:1 is 300. This is because in this case, the evaluation value in time step T:1 that is the state ahead of the offshoot is 300 and is less than 500 which is the predetermined value. The plan generation unit 101Z does not decrease the priority of the offshoot for which the evaluation value in time step T:0 is 1000, and the evaluation value in time step T:1 is 600. This is because in this case, the evaluation value in time step T:1 that is the state ahead of the offshoot is 600 and is greater than 500 which is the predetermined value.

For example, the plan generation unit 101Z increases the priority of the offshoot for which the evaluation value of the state (subsequent state) ahead of the offshoot is greater than a predetermined value. Hereinafter, a specific example will be illustrated. The predetermined value is set to 1200. The plan generation unit 101Z increases the priority of the offshoot for which the evaluation value in time step T:0 is 1000, and the evaluation value in time step T:1 is 1300. This is because in this case, the evaluation value in time step T:1 that is the state ahead of the offshoot is 1300 and is greater than 1200 which is the predetermined value. The plan generation unit 101Z does not increase the priority of the offshoot for which the evaluation value in time step T:0 is 1000, and the evaluation value in time step T:1 is 1100. This is because in this case, the evaluation value in time step T:1 that is the state ahead of the offshoot is 1100 and is less than 1200 which is the predetermined value.

The plan generation unit 101Z may decide the priority of the offshoot in accordance with a difference between the evaluation value in the subsequent state and the evaluation value in the preceding state.

For example, the plan generation unit 101Z decreases the priority of the offshoot for which a degree of decrease in the evaluation value in the subsequent state with respect to the evaluation value in the preceding state is greater than a predetermined value. Hereinafter, a specific example will be illustrated. The predetermined value is set to 500. The plan generation unit 101Z decreases the priority of the offshoot for which the evaluation value in time step T:0 is 1000, and the evaluation value in time step T:1 is 300. This is because in this case, the degree of decrease in the evaluation value is 700 and is greater than 500 which is the predetermined value. The plan generation unit 101Z does not decrease the priority of the offshoot for which the evaluation value in time step T:0 is 1000, and the evaluation value in time step T:1 is 600. This is because in this case, the degree of decrease in the evaluation value is 400 and is less than 500 which is the predetermined value.

For example, the plan generation unit 101Z increases the priority of the offshoot for which a degree of increase in the evaluation value in the subsequent state with respect to the evaluation value in the preceding state is greater than a predetermined value. Hereinafter, a specific example will be illustrated. The predetermined value is set to 200. The plan generation unit 101Z increases the priority of the offshoot for which the evaluation value in time step T:0 is 1000, and the evaluation value in time step T:1 is 1300. This is because in this case, the degree of increase in the evaluation value is 300 and is greater than 200 which is the predetermined value. The plan generation unit 101Z does not increase the priority of the offshoot for which the evaluation value in time step T:0 is 1000, and the evaluation value in time step T:1 is 1100. This is because in this case, the degree of increase in the evaluation value is 100 and is less than 200 which is the predetermined value.

Besides, the plan generation unit 101Z may decide a degree of increase or a degree of decrease in the priority in accordance with the difference between the evaluation value in the subsequent state and the evaluation value in the preceding state. For example, the plan generation unit 101Z may increase the degree of increase in the priority as an amount of increase in the evaluation value is increased. The plan generation unit 101Z may increase the degree of decrease in the priority as an amount of decrease in the evaluation value is increased.

The preceding state may be one state before the subsequent state or two or more states before the subsequent state. For example, it is assumed that the subsequent state is a state in time step T:5. The preceding state may be a state in time step T:4 or the state in time step T:0 (a start location of a branch).

The plan generation unit 101Z generates the plan based on the priority of the offshoot. For example, the plan generation unit 101Z preferentially expands an offshoot having a high priority over an offshoot having a low priority. As a specific example, the plan generation unit 101Z further expands the offshoot having a low priority by the remaining M states and further expands the offshoot having a high priority by the remaining N states. At this point, M<N is established, and M is an integer greater than or equal to 0. Further expansion by 0 states means that no further expansion is performed.

As described above, by causing the plan generation unit 101Z to decide the priority of the offshoot connecting from the preceding task to the subsequent task in accordance with the evaluation value of the subsequent task and generate the plan based on the priority of the offshoot, an enormous increase in the number of states in the expansion of the task can be prevented.

Time Travel and Branch Addition

For example, in an action game, the control target character performs an action in the game. This action corresponds to the task. A situation in the game does not necessarily improve for the character as a result of performing the action by the control target character. The situation may deteriorate by the character as a result of performing the action. In such a case, as a method for causing the control target character to select execution of different actions, adding a branch for time travel to the tree structure included in the generated plan is considered.

In a case where executing the action corresponding to the task by the character decreases the evaluation value of the action below a predetermined value, the plan generation unit 101Z adds a branch for canceling the action to the plan.

Figure 30:
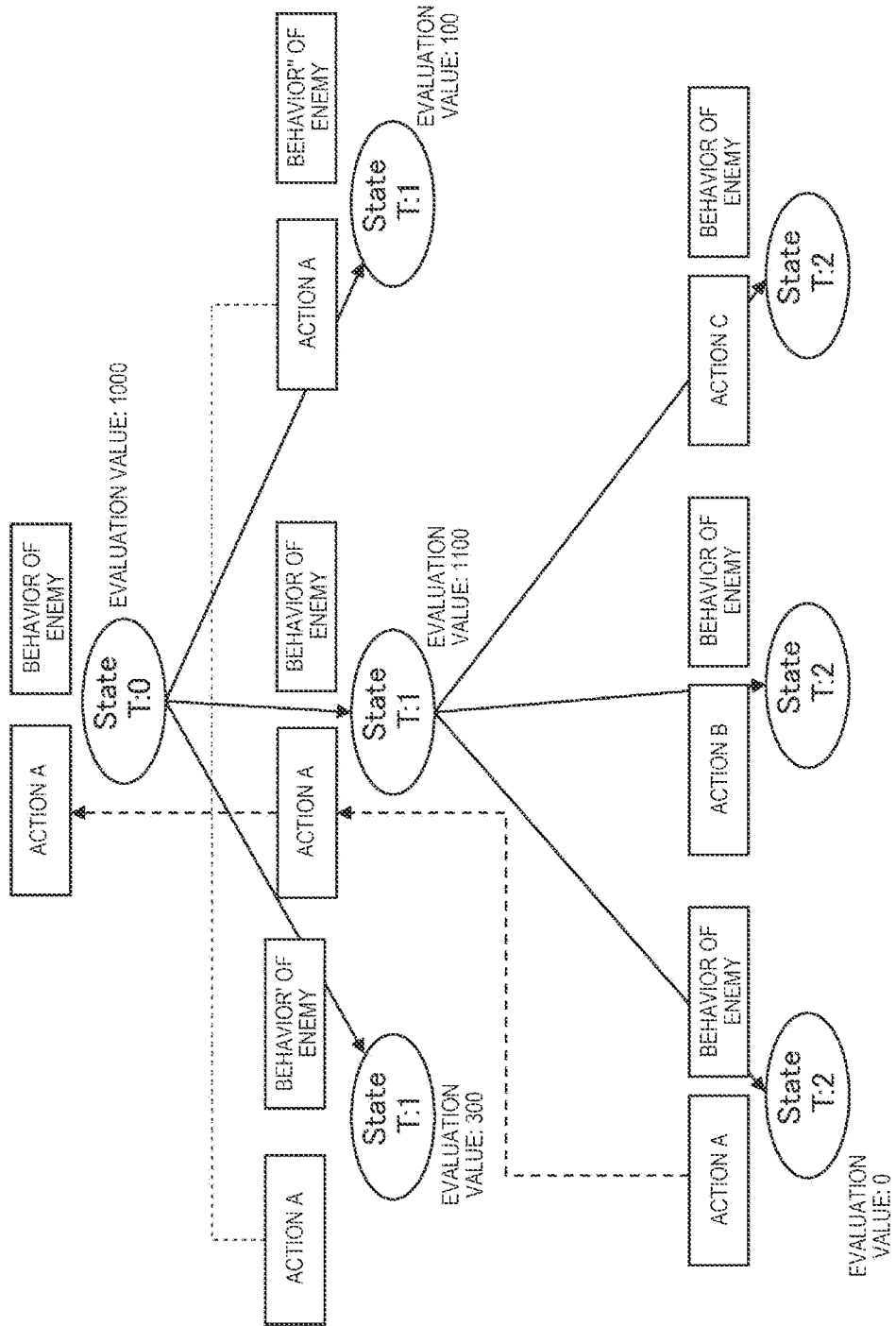
FIG. 30 is a conceptual diagram illustrating an example of adding a branch of time travel according to at least one embodiment of the present invention.

FIG. 30 is a conceptual diagram illustrating an example of adding the branch for time travel according to at least one embodiment of the present invention. The evaluation value at a point in time (time step T:0) when the control target character starts executing an action A corresponding to the task included in the plan is 1000. Here, for example, the predetermined value is set to 400. The plan generation unit 101Z adds a branch for time travel from a node (time step T:1 or time step T:2) in which the evaluation value is below 400 to a node (time step T:0) at a point in time of the start of the action A to the plan. The branch for time travel is drawn by a broken line arrow in FIG. 30. The action A is canceled by the branch for time travel, and the control target character can select different actions.

The evaluation value corresponding to a branch at which the behavior is switched to a different action B or action C in the middle of executing the action A may be calculated in accordance with an attribute of the corresponding task.

Partial Plan

Next, a partial plan will be described. The partial plan means a set of tasks that may be included in the plan and have a decided certain degree of flow. For example, the partial plan may be represented by a directed acyclic graph (DAG).

Figure 31:
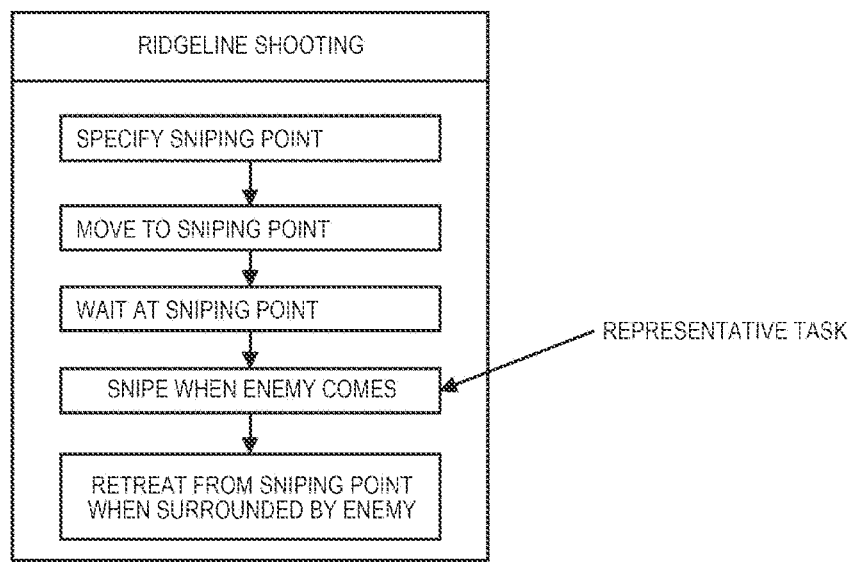
FIG. 31 is a conceptual diagram illustrating a partial plan according to at least one embodiment of the present invention.

FIG. 31 is a conceptual diagram illustrating the partial plan according to at least one embodiment of the present invention. Here, a partial plan of ridgeline shooting is illustrated. The ridgeline shooting that is a partial plan may be included in a part of the plan generated by the plan generation unit 101Z.

The ridgeline shooting that is a partial plan is configured with the following partial tasks.

Specify sniping point
Move to sniping point
Wait at sniping point

Snipe when enemy comes

Retreat from sniping point when surrounded by enemy

Among the plurality of partial tasks, a partial task "snipe when enemy comes" corresponds to a task (representative task) as a representative in the partial plan "ridgeline shooting".

The representative task means a task that represents the partial plan. A plurality of representative tasks may be included in the partial plan.

Figure 32:
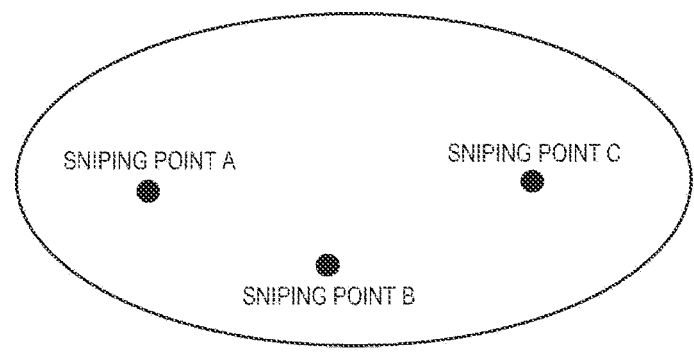
FIG. 32 is a conceptual diagram illustrating candidates of a sniping point corresponding to a partial task according to at least one embodiment of the present invention.

FIG. 32 is a conceptual diagram illustrating candidates of the sniping point corresponding to the partial task according to at least one embodiment of the present invention. As illustrated, a plurality of sniping points to which the control target character can move in the game may be present. Performing simulation by the simulator 110 using all sniping points as candidate points may increase a process load. Therefore, performing pruning by determining whether or not a partial scheme is an effective partial scheme in advance is considered.

That is, the plan generation unit 101Z calculates a representative evaluation value for one or more representative tasks included in the partial plan configured with a plurality of tasks and calculates the evaluation value for the partial plan in which evaluation for the representative task is increased.

For example, as in the above example in which the representative task of the partial plan "ridgeline shooting" is "snipe when enemy comes", the representative task may be a central task of the partial plan.

The same partial plan may have different tasks as the representative task. For example, in a case of focusing on a success or a failure of an attack on the enemy character, the representative task of the partial plan "ridgeline shooting" is "snipe when enemy comes". In a case of focusing on whether or not the enemy character finds the control target character, the representative task of the partial plan "ridgeline shooting" may be "move to sniping point".

The representative evaluation value may indicate higher evaluation as the value is increased or higher evaluation as the value is decreased.

Figure 33:
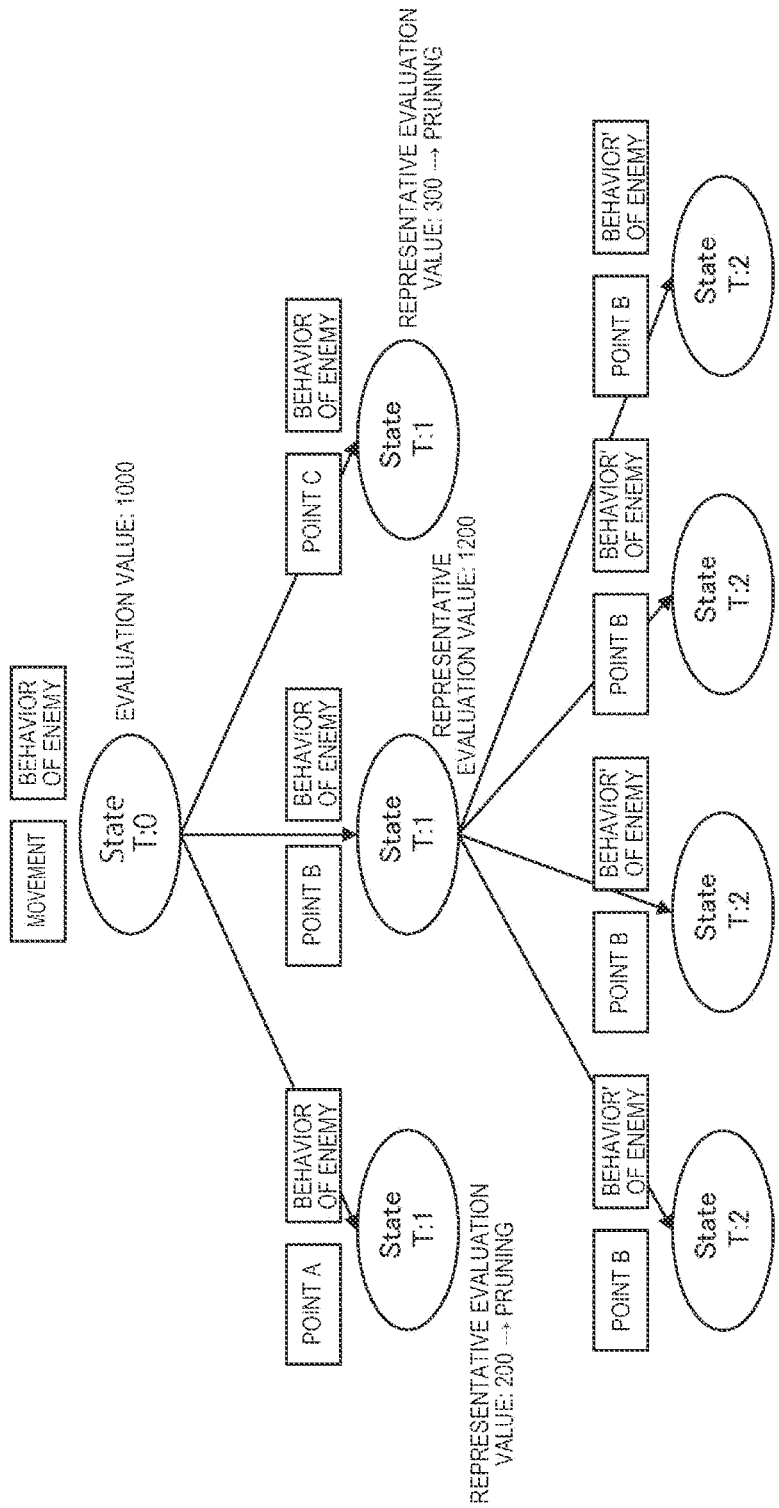
FIG. 33 is a conceptual diagram illustrating calculation and pruning of a representative evaluation value according to at least one embodiment of the present invention.

FIG. 33 is a conceptual diagram illustrating calculation and pruning of the representative evaluation value according to at least one embodiment of the present invention. In time step T:0, the control target character starts movement. Three branches in time step T:1 occur in accordance with an objective position (sniping point) of the movement.

Here, it is assumed that the partial plan is "ridgeline shooting", and the representative task is "snipe when enemy comes". It is assumed that the representative evaluation value indicates higher evaluation as the value is increased. In addition, it is assumed that a predetermined threshold for determining whether or not evaluation is high for the representative task is 400.

The plan generation unit 101Z calculates the representative evaluation value for the representative task "snipe when enemy comes" for each of sniping points A, B, and C.

The representative evaluation value for the representative task "snipe when enemy comes" for the sniping point A is 200. The representative evaluation value for the representative task "snipe when enemy comes" for the sniping point B is 1200. The representative evaluation value for the representative task "snipe when enemy comes" for the sniping point C is 300. The sniping point A and the sniping point C for which the representative evaluation value is less than 400 which is the predetermined threshold are pruned. That is, the plan generation unit 101Z does not perform further task expansion for a branch "snipe when enemy comes" at the sniping point A or the sniping point C.

The sniping point B for which the representative evaluation value is greater than 400 which is the predetermined threshold is not pruned. That is, further task expansion is performed for a branch "snipe when enemy comes" at the sniping point B.

The plan generation unit 101Z calculates the evaluation value for the partial plan in which evaluation for the representative task is increased. In the above example, the evaluation value for the partial plan "ridgeline shooting" in which sniping is performed at the sniping point B is calculated. The plan generation unit 101Z may generate the plan based on the evaluation value for the partial plan.

Accordingly, since task expansion can be performed by narrowing down to a task that is worthy of execution, the process load can be suppressed.

As one aspect of the seventh embodiment, planning that can flexibly handle an environmental change can be performed based on the hierarchical task network.

As one aspect of the seventh embodiment, an execution entity (for example, the control target character) of the task can be flexibly controlled.

As one aspect of the seventh embodiment, the control target character can efficiently execute the task in an environment at the time of plan execution while complying with an approximate plan.

As one aspect of the seventh embodiment, since plan generation is performed based on logical inference, performing simulation enables planning to be performed after a situation change corresponding to task execution is predicted.

As one aspect of the seventh embodiment, the tentative execution of the task by the simulator 110 can be performed at a high speed, and the plan generation unit 101Z can quickly generate the plan.

As one aspect of the seventh embodiment, planning that can flexibly handle an environmental change caused by the object (for example, the enemy character) other than the control target character can be performed.

As one aspect of the seventh embodiment, an enormous increase in the number of states in the expansion of the task by the plan generation unit 101Z can be prevented.

As one aspect of the seventh embodiment, the control target character can select execution of different actions in a real-time environment.

As one aspect of the seventh embodiment, the task expansion can be performed by narrowing down to a task that is worthy of execution. Thus, the process load can be suppressed.

Implementation Example

Hereinafter, an implementation example will be illustrated for the plan processing program according to at least one embodiment of the present invention. The implementation example is not intended to limit the scope of the present disclosure.

The plan processing program according to at least one embodiment of the present invention integrates a state space search into a method of planning (HTN). In HTN that is a planning method in the related art, a discrete state space represented by a symbol is searched for, and an output behavior list is sequentially executed. Meanwhile, in the plan processing program according to at least one embodiment of the present invention, the plan generation unit 101Z searches for a state space using a simulator that reproduces a situation close to a game (a space in which a character may execute a task).

The plan generated by the plan generation unit 101Z includes a task. In at least one embodiment of the present invention, the task has a precondition function and a simulate function. The task may not have an effect. The precondition function is a function for determining whether or not the task can be executed. The simulate function is a function for simulating the task.

By having the above configuration, a change in continuous value (for example, the health value of the control target character, positional coordinates, or the remaining number of bullets of a shooting weapon) can be searched for in the generation of the plan by the plan generation unit 101Z.

The simulator updates a predetermined in-game time for each simulation step. The simulator discretizes the behavior (action) of the control target character such that each simulation step can be represented by a game tree of one node.

Figure 34:
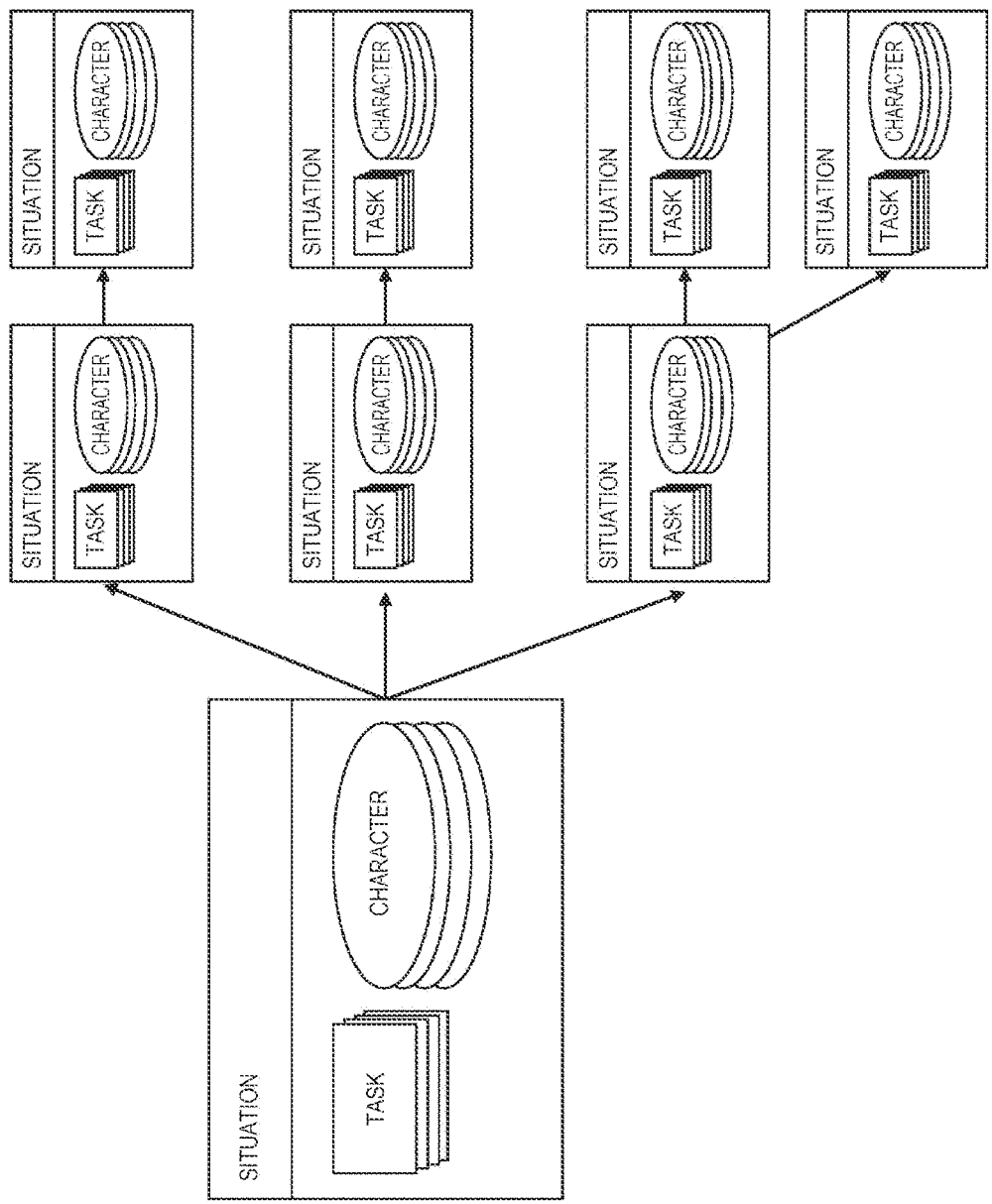
FIG. 34 is a conceptual diagram illustrating an implementation example of the plan according to at least one embodiment of the present invention.

Next, an implementation example of the plan will be described. FIG. 34 is a conceptual diagram illustrating an implementation example of the plan according to at least one embodiment of the present invention. For example, the plan generation unit 101Z outputs (generates) a plan tree that has a structure close to the game tree as illustrated in FIG. 34.

Each node included in the plan tree has a situation and a task. This can be construed as the situation being added to the task in the plan in which the subsequent task to be employed is configured to change in accordance with the state or the condition. In addition, hereinafter, the plan tree generated by combining the situation with the task as illustrated in FIG. 34 will be referred to as a situation-task network.

The situation-task network has a network structure by a plurality of connected states (situations) and thus, can be construed as a state space. The state space search in this implementation example means a search for a node in the situation-task network. For example, an entity that performs the state space search is the plan generation unit 101Z. The plan generation unit 101Z may perform the state space search by tentatively executing the task included in the situation-task network to obtain the evaluation value using the simulator.

The situation means a simplified model of the game space. The situation includes simplified data in the game space. For example, an internal condition such as a position or the health value of the control target character or a state ID of an adversarial AI agent is an example of the simplified data included in the situation.

The situation has a link to a preceding situation and/or a subsequent situation. Consequently, the plan tree forms a graph.

The task includes a primitive task and a composite task. The composite task is referred to as a compound task.

In the implementation example according to at least one embodiment of the present invention, the primitive task corresponds to a simple action task. The action task has the precondition function and the simulate function.

In the implementation example according to at least one embodiment of the present invention, the composite task corresponds to an action that is more complex than the primitive task. In the implementation example, the composite task is divided into two basic types. However, this is merely an implementation example and is not intended to exclude a composite task of one type.

A first basic type of the composite task is an FSM task. An FSM is the abbreviation for Finite State Machine. The FSM task can be used as a model of a behavior of a character different from the control target character, such as the enemy character.

A second basic type of the composite task is a step task. The step task is an FSM having a very simple structure. The step task is almost the same as a sequence node of a behavior tree. However, the step task can have simple one or more loops or a plurality of branches.

Next, a study for reducing the process load or the number of nodes will be described. In a case where a search range is excessively wide in a state search of the entire game, the simulator may perform simulation by narrowing down to all characters present near the control target character or a change in dynamically moving object.

In a case of applying a normal game tree search, the number of nodes may be exponentially increased. In a case of the plan processing program according to at least one embodiment of the present invention, an increase in the number of nodes can be suppressed by utilizing an idea of HTN in the plan tree. More specifically, the simulator is set to be capable of executing the composite task. The composite task has a nested structure and is configured with a plurality of subtasks. The subtasks are composite tasks or primitive tasks. The simulator may have a function of decomposing the composite task into subtasks. The simulator may employ a plan decomposition function of the planner (plan generation unit 101Z) or the executor (plan execution unit 102Z).

The plan generation unit 101Z generates a plan tree in which the composite task is arranged (together with the situation) for a node. Accordingly, the plan generation unit 101Z does not need to generate the plan tree in a completely decomposed state. Since an internal transition destination of the composite task is limited, an increase in the number of nodes of the plan tree can be suppressed.

In the state space search performed by the plan generation unit 101Z, an increase in the number of nodes can be suppressed by searching for only a behavior of meaningful granularity in the game.

The granularity is a representation indicating coarseness, a size, or the like of a constituting unit of data, a program, a work step, or the like. In the implementation example according to at least one embodiment of the present invention, a size of a concept for the action (task) performed by the control target character or the like corresponds to a size of the granularity. For example, the granularity of an action "walk" is greater than the granularity of an action such as "move right foot forward" or "move left foot forward". The granularity of the action "step right foot forward" is greater than the granularity of an action such as "raise knee", "move toe forward", or "lower knee". Generally, the compound task having high granularity includes subtasks having lower granularity. In the state space search performed by the plan generation unit 101Z, a task to be searched for is limited to a task having granularity corresponding to a meaningful behavior in a target game. For example, a task such as "move to position of barrier", "approach enemy", or "move away from enemy" corresponds to the task having granularity corresponding to a meaningful behavior in the target game. That is, the plan generation unit 101Z performs the state space search by limiting the task to be searched for to a task having granularity greater than or equal to a predetermined size. Accordingly, an increase in the number of nodes to be searched for can be suppressed. In addition, by applying the method of searching for only a behavior having meaningful granularity to the state space search using the simulator, a highly practical plan tree can be generated.

Furthermore, the plan generation unit 101Z does not perform a search such as random selection of a behavior of a minimum unit performed in the reinforcement learning method or the like. This can also suppress an increase in the number of nodes to be searched for.

Next, a study for the time of plan execution will be described. The plan execution unit 102Z searches for a node close to the current situation from the plan tree generated based on pre-simulation using the simulator. Various information indicating the current situation may be stored in the world state. The plan execution unit 102Z may acquire the various information indicating the current situation from the world state.

The plan execution unit 102Z selects a node having a high evaluation value among one or more searched nodes. The plan execution unit 102Z causes the control target character to execute a behavior corresponding to the selected node. Accordingly, the control target character can selectively execute a more effective behavior among behaviors matching the current situation.

Next, a study related to a method of deciding the evaluation value of each node included in the plan tree will be described. The evaluation value may be set for each node of the plan tree. The plan generation unit 101Z reflects the evaluation value on an intermediate node in reaching a node corresponding to a final result of the plan tree by backpropagation from a final result (for example, a victory or a defeat) of the simulation using the simulator.

Accordingly, even in a stage of the intermediate node of the plan tree, effectiveness (for example, a chance of victory) of a behavior in a case of executing a series of tasks including the intermediate node can be estimated.

Next, an implementation example for simulation, planning, plan execution, and the like based on the situation-task network will be described. As illustrated in FIG. 34, each node of the plan tree may include information indicating a plurality of characters in addition to information indicating the situation and information indicating the task. The plurality of characters include the control target character. For example, the plurality of characters may include the character other than the control target character, such as the enemy character.

The plan generation unit 101Z generates the situation-task network using the simulator executed on a height map that is an example of the spatial information. In a case where the action (that is, the task) of the control target character can be selected, the plan generation unit 101Z creates a plurality of branching offshoots (branches) by expanding a terminal node. A model corresponding to the enemy character generates a branching offshoot (branch) with a constant probability when, for example, the behavior of the enemy character is changed.

Figure 35:
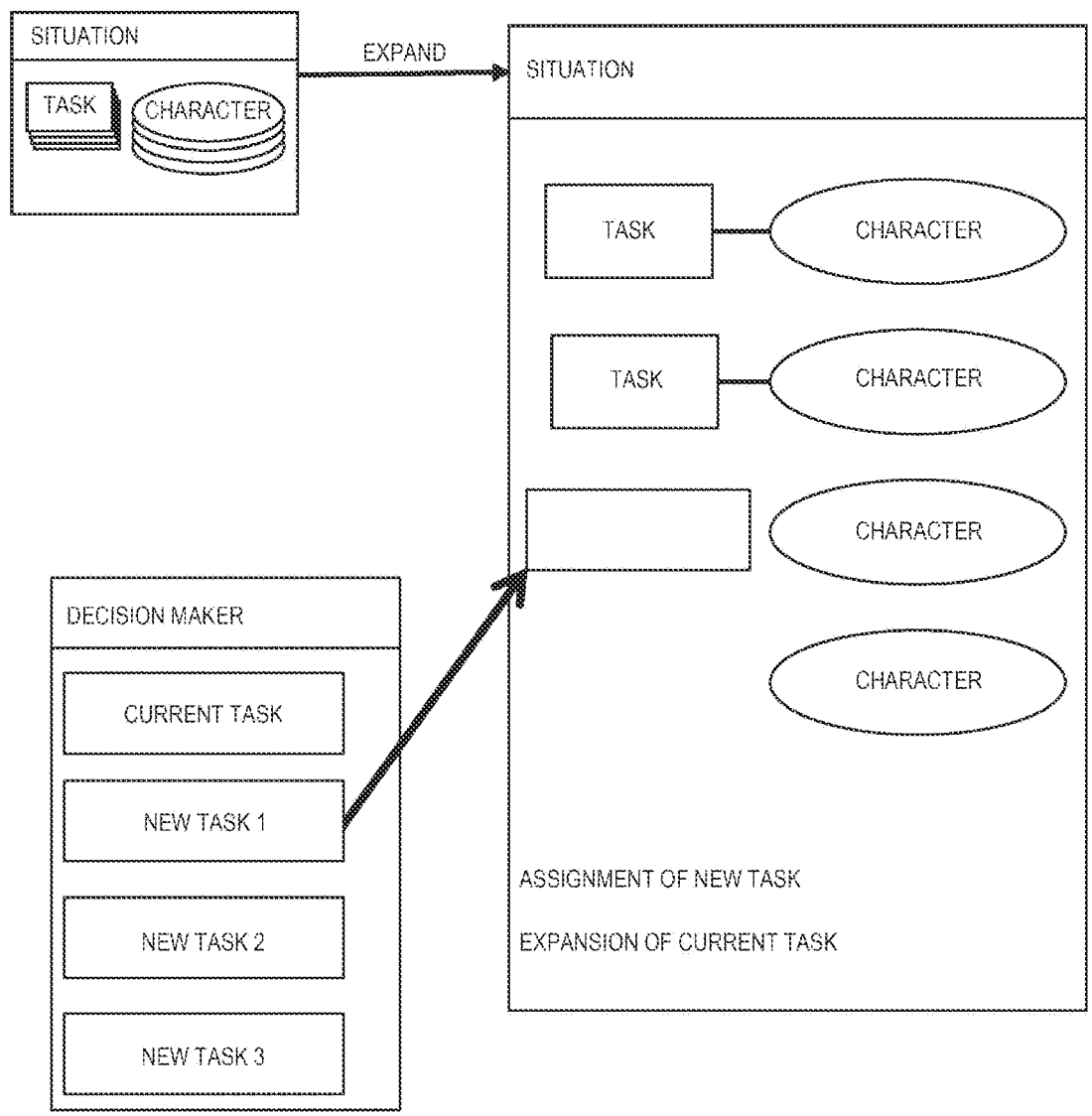
FIG. 35 is a conceptual diagram illustrating an assignment process of the task in the implementation example of the plan according to at least one embodiment of the present invention.

FIG. 35 is a conceptual diagram illustrating an assignment process of the task in the implementation example of the plan according to at least one embodiment of the present invention. Here, a decision maker is a subfunction, included in the plan generation unit 101Z, of assigning the task.

For example, the assignment of the task is performed as follows. The decision maker expands a terminal situation node by selecting a task for each character. In a case where the precondition matches the situation, the decision maker can assign a primitive task.

In a case where the precondition matches the situation, the decision maker can assign a composite task. In addition, in a case where task expansion is allowed in a node including the current composite task, the decision maker can expand the current composite task. In this case, a plurality of copy instances are created from the node including the composite task, and internal state IDs of the created copy instances are corrected.

Figure 36:
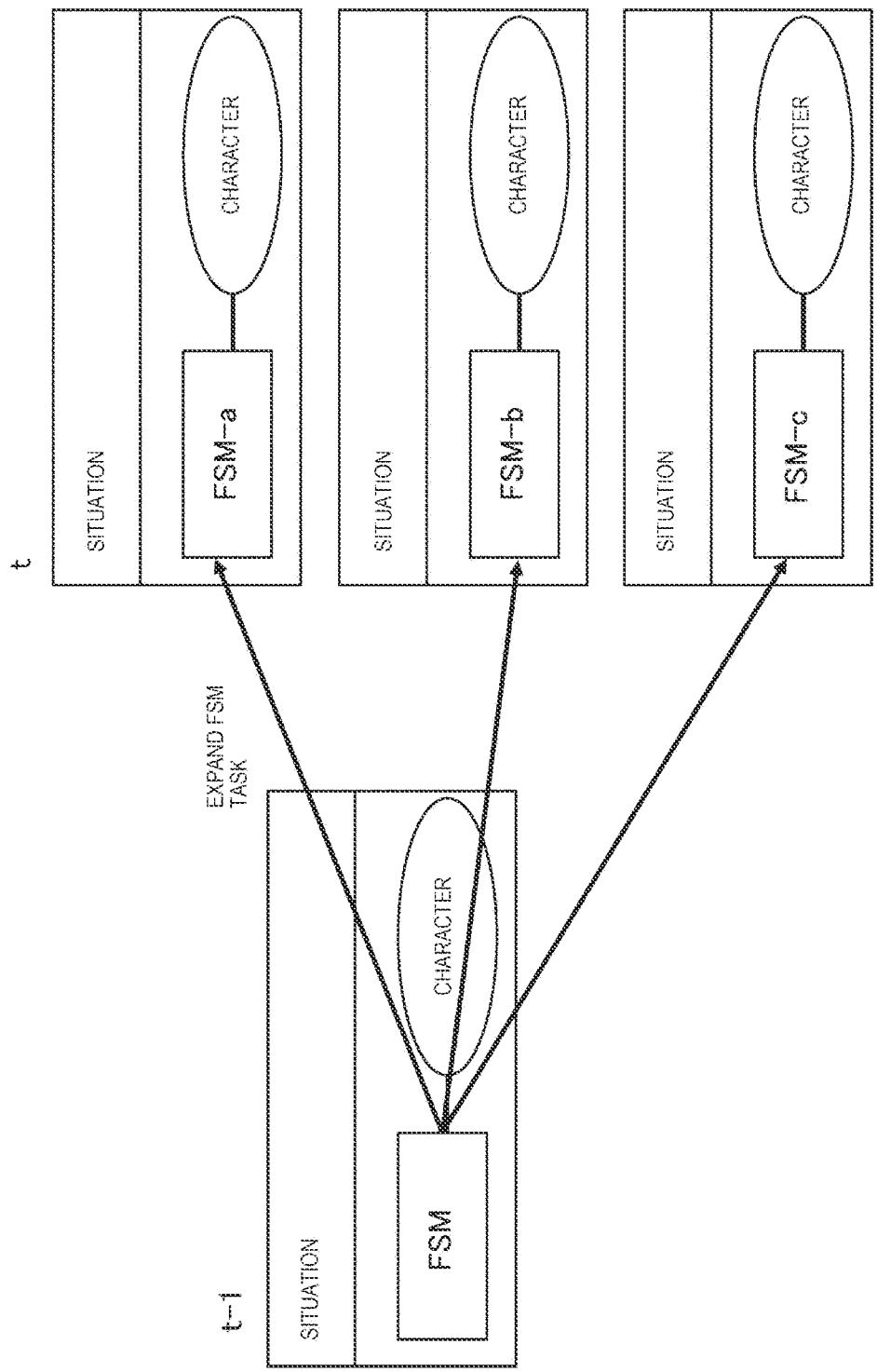
FIG. 36 is a conceptual diagram illustrating expansion of a composite task in the implementation example of the plan according to at least one embodiment of the present invention.

FIG. 36 is a conceptual diagram illustrating the expansion of the composite task in the implementation example of the plan according to at least one embodiment of the present invention. The in-game time before expansion of the task is denoted by t−1, and the in-game time after expansion of the task is denoted by t. It is assumed that an FSM task has transitions to a state a, a state b, and a state c. The FSM task is expanded into an FSM task a to an FSM task c, and an instance of each of the FSM task a to the FSM task c is copied. Before the FSM task executes a state transition, all data in the FSM task are copied to create versions a to c of a task instance.

The decision maker of each agent may perform the above process. Accordingly, the total number of situation nodes may be increased. As a study for decreasing a size of the situation-task network, a predetermined threshold is acquired by an expansion function of the plan generation unit 101Z. For example, the expansion function generates a random number, and the task is expanded only in a case where a value of the random number exceeds the predetermined threshold.

Next, a decomposition example of the task will be described. FIG. 37 is a conceptual diagram illustrating decomposition of the task in the implementation example of the plan according to at least one embodiment of the present invention. A task to be used in a given situation is selected by the situation-task network. Here, the task is data and cannot be executed in a game environment. In order to execute the task, the executor (plan execution unit 102Z) decomposes the task up to operators that can be executed in the game environment.

First, the executor looks at a branching offshoot (branch) of a situation and selects a task having a high evaluation value. The executor decomposes the selected task up to the operators and sequentially executes the operators.

As described above, each embodiment of the present application solves one or two or more deficiencies. Effects of each embodiment are non-limiting effects or an example of effects.

In each embodiment, the user terminal 20 and the server 10 execute the above various processes in accordance with various control programs (for example, the plan processing program) stored in the respective storage apparatuses thereof. In addition, other computers not limited to the user terminal 20 and the server 10 may execute the above various processes in accordance with various control programs (for example, the plan processing program) stored in the respective storage apparatuses thereof.

In addition, the configurations of the video game processing systems 100 and 100A are not limited to the configurations described as an example of each embodiment. For example, a part or all of the processes described as a process executed by the user terminal may be configured to be executed by the server 10. A part or all of the processes described as a process executed by the server 10 may be configured to be executed by the user terminal 20. In addition, a part or the entire storage unit (storage apparatus) included in the server 10 may be configured to be included in the user terminal 20. That is, a part or all of the functions included in any one of the user terminal and the server in the video game processing systems 100 and 100A may be configured to be included in the other.

In addition, the program may be caused to implement a part or all of the functions described as an example of each embodiment in a single apparatus not including the communication network.

APPENDIX

The above description of the embodiments is disclosed in order for those of ordinary knowledge in the field of the invention to embody at least the following invention.

[1] A plan processing program for planning a task executed by a character based on a hierarchical task network, the plan processing program causing a server to implement a plan generation function of generating a plan configured with a plurality of tasks from a domain based on goal information, in which in the plan generation function, a function of generating the plan in which a subsequent task to be employed is configured to change in accordance with a state or a condition is implemented.

[2] The plan processing program according to [1], further causing the server to implement a plan execution function of acquiring the plan generated by the plan generation function and sequentially executing the tasks included in the plan, in which in the plan execution function, a function of sequentially executing the tasks included in the plan after changing a part of the acquired plan is implemented.

[2-2] The plan processing program according to [2], further causing the server to implement a task decomposition function of decomposing the tasks into a plurality of more specific tasks, in which in the plan generation function, a function of generating the plan after performing task decomposition up to a predetermined layer by the task decomposition function is implemented, and in the plan execution function, a function of sequentially executing the tasks included in the plan after performing the task decomposition on at least a part of the tasks included in the plan up to a layer deeper than the predetermined layer is implemented.

[3] The plan processing program according to any one of [1] to [2-2], in which in the plan generation function, a function of calculating an evaluation value by tentatively executing a plurality of selectable tasks included in the domain by a simulator and generating the plan based on the goal information and the evaluation value is implemented.

[3-2] The plan processing program according to [3], in which in the plan, the tasks are executed using first spatial information corresponding to a space in which the character can execute the tasks, the simulator tentatively executes the selectable tasks using second spatial information corresponding to the space, and the second spatial information has a smaller information amount than the first spatial information.

[4] The plan processing program according to any one of [1] to [3-2], in which in the plan generation function, a function of generating the plan from the domain based on the goal information and task execution, an action, or a state change of an object other than the character is implemented.

[5] The plan processing program according to any one of [1] to [4], in which in the plan generation function, a function of deciding a priority of an offshoot connecting from a preceding task to a subsequent task in accordance with an evaluation value of the subsequent task and generating the plan based on the priority of the offshoot is implemented.

[6] The plan processing program according to any one of [1] to [5], in which in the plan generation function, a function of, in a case where executing an action corresponding to a task by the character decreases an evaluation value of the action below a predetermined value, adding a branch for canceling the action to the plan is implemented.

[7] The plan processing program according to any one of [1] to [6], in which in the plan generation function, a function of calculating a representative evaluation value for one or more representative tasks included in a partial plan configured with a plurality of tasks and calculating an evaluation value for a partial plan in which evaluation for the representative task is increased is implemented.

[8] A program causing a user terminal capable of communicating with the server to implement at least one function of the functions that the plan processing program according to any one of [1] to [7] causes the server to implement.

[9] A server on which the plan processing program according to any one of [1] to [7] is installed.

[10] A task processing system that includes a communication network, a server, and a user terminal and plans a task executed by a character based on a hierarchical task network, the task processing system including plan generation means for generating a plan configured with a plurality of tasks from a domain based on goal information, in which in the plan generation means, the plan in which a subsequent task to be employed is configured to change in accordance with a state or a condition is generated.

[11] A plan processing program for planning a task executed by a character based on a hierarchical task network, the plan processing program causing a user terminal to implement a plan generation function of generating a plan configured with a plurality of tasks from a domain based on goal information, in which in the plan generation function, a function of generating the plan in which a subsequent task to be employed is configured to change in accordance with a state or a condition is implemented.

[12] A user terminal on which the plan processing program according to [11] is installed.

[13] A plan processing program for planning a task executed by a character based on a hierarchical task network, the plan processing program causing a computer apparatus to implement a plan generation function of generating a plan configured with a plurality of tasks from a domain based on goal information, in which in the plan generation function, a function of generating the plan in which a subsequent task to be employed is configured to change in accordance with a state or a condition is implemented.

[14] A task processing method, by a computer apparatus, for planning a task executed by a character based on a hierarchical task network, the task processing method including a plan generation process of generating a plan configured with a plurality of tasks from a domain based on goal information, in which in the plan generation process, the plan in which a subsequent task to be employed is configured to change in accordance with a state or a condition is generated.

[15] A task processing method, by a system including a communication network, a server, and a user terminal, for planning a task executed by a character based on a hierarchical task network, the task processing method including a plan generation process of generating a plan configured with a plurality of tasks from a domain based on goal information, in which in the plan generation process, the plan in which a subsequent task to be employed is configured to change in accordance with a state or a condition is generated.

INDUSTRIAL APPLICABILITY

One embodiment of the present invention is useful as a plan processing program and a plan processing system that can perform planning which can flexibly handle an environmental change based on a hierarchical task network.

What is claimed is:

1. A non-transitory computer readable medium storing a program that, when executed, causes a processor of a server to:
   acquire goal information related to an objective to be accomplished by a character in a virtual space;
   acquire state-related information of the virtual space to which the character belongs;
   extract a plurality of tasks from a domain to be included in a plan for controlling a behavior of the character in the virtual space, wherein the domain includes a set of tasks in a layered state in a hierarchical task network, and the tasks are executable by the character in the virtual space;
   generate the plan including the plurality of tasks based on the goal information such that a subsequent task to be employed among the plurality of tasks included in the plan changes in accordance with a state or a condition;
   calculate an evaluation value of a candidate task to be employed as the subsequent task in a case of a predetermined condition among the plurality of tasks included in the plan by a simulator based at least on the state-related information, the simulator configured to tentatively execute the candidate task; and
   set the candidate task as the subsequent task to be employed in the case of the predetermined condition based on the evaluation value.

2. The non-transitory computer readable medium according to claim 1, wherein the program, when executed, causes the processor of the server to sequentially execute the tasks included in the plan after changing a part of the plan.

3. The non-transitory computer readable medium according to claim 1, the program, when executed, causes the processor of the server to:
   generate the plan after performing task decomposition up to a predetermined layer; and
   sequentially execute the tasks included in the plan after performing the task decomposition on at least a part of the tasks included in the plan up to a layer deeper than the predetermined layer.

4. The non-transitory computer readable medium according to claim 1, wherein the program, when executed, causes the processor of the server to decompose the tasks into a plurality of more specific tasks.

5. The non-transitory computer readable medium according to claim 1, wherein the program, when executed, causes the processor of the server to sequentially execute the tasks included in the plan while changing a part of the plan.

6. The non-transitory computer readable medium according to claim 1, wherein
   in the plan, the tasks are executed using first spatial information corresponding to a space in which the character can execute the tasks,
   the simulator tentatively executes the candidate task using second spatial information corresponding to the space, and
   the second spatial information has a smaller information amount than the first spatial information.

7. The non-transitory computer readable medium according to claim 1, wherein the program, when executed, causes the processor of the server to generate the plan from the domain based on the goal information and based on task execution, an action, or a state change of an object other than the character.

8. The non-transitory computer readable medium according to claim 1, wherein the program, when executed, causes the processor of the server to:
   decide a priority of an offshoot connecting from a preceding task to a subsequent task in accordance with an evaluation value of the subsequent task; and
   generate the plan based on the priority of the offshoot.

9. The non-transitory computer readable medium according to claim 1, wherein the program, when executed, causes the processor of the server to, in a case where execution of an action corresponding to one or more tasks among the plurality of tasks included in the plan by the character decreases an evaluation value of the action below a predetermined value, add a branch for canceling the action to the plan.

10. The non-transitory computer readable medium according to claim 1, wherein the program, when executed, causes the processor of the server to:
    calculate a representative evaluation value for one or more representative partial tasks among a plurality of partial tasks included in a partial plan; and
    calculate an evaluation value for the partial plan in which evaluation for the representative task is increased.

11. A task processing system that includes a communication network, a server, and a user terminal, the task processing system comprising a processor to execute:
    acquiring goal information related to an objective to be accomplished by a character in a virtual space;
    acquiring state-related information of the virtual space to which the character belongs;
    extracting a plurality of tasks from a domain to be included in a plan for controlling a behavior of the character in the virtual space, wherein the domain includes a set of tasks in a layered state in a hierarchical task network, and the tasks are executable by the character in the virtual space;
    generating the plan including the plurality of tasks based on the goal information such that a subsequent task to be employed among the plurality of tasks included in the plan changes in accordance with a state or a condition;
    calculating an evaluation value of a candidate task to be employed as the subsequent task in a case of a predetermined condition among the plurality of tasks included in the plan by a simulator based at least on the state-related information, the simulator configured to tentatively execute the candidate task; and
    setting the candidate task as the subsequent task to be employed in the case of the predetermined condition based on the evaluation value.

12. A non-transitory computer readable medium storing a program that, when executed, causes a processor of a user terminal to:
    acquire goal information related to an objective to be accomplished by a character in a virtual space;
    acquire state-related information of the virtual space to which the character belongs;
    extract a plurality of tasks from a domain to be included in a plan for controlling a behavior of the character in the virtual space, wherein the domain includes a set of tasks in a layered state in a hierarchical task network, and the tasks are executable by the character in the virtual space;

calculate evaluation values of the extracted tasks by a simulator based at least on the state-related information;

generating the plan including the plurality of tasks based on the goal information and the evaluation values such that a subsequent task to be employed among the plurality of tasks included in the plan changes in accordance with a state or a condition;

calculate an evaluation value of a candidate task to be employed as the subsequent task in a case of a predetermined condition among the plurality of tasks included in the plan by a simulator based at least on the state-related information, the simulator configured to tentatively execute the candidate task; and set the candidate task as the subsequent task to be employed in the case of the predetermined condition based on the evaluation value.

* * * * *